US011971021B1

(12) United States Patent
Anthony

(10) Patent No.: US 11,971,021 B1
(45) Date of Patent: Apr. 30, 2024

(54) SOLID STATE MULTI-STROKE THERMAL ENGINE

(71) Applicant: Michael Mark Anthony, Hohenwald, TN (US)

(72) Inventor: Michael Mark Anthony, Hohenwald, TN (US)

(*) Notice: Subject to any disclaimer, the term of this patent is extended or adjusted under 35 U.S.C. 154(b) by 403 days.

(21) Appl. No.: 16/602,475

(22) Filed: Oct. 15, 2019

Related U.S. Application Data

(63) Continuation-in-part of application No. 14/545,996, filed on Jul. 15, 2015, which is a continuation-in-part of application No. 13/506,943, filed on May 25, 2012, now Pat. No. 9,500,158, which is a continuation-in-part of application No. 12/380,626, filed on Mar. 2, 2009, now Pat. No. 8,186,160.

(60) Provisional application No. 62/766,383, filed on Oct. 15, 2018.

(51) Int. Cl.
   *F03G 7/06* (2006.01)
(52) U.S. Cl.
   CPC .................... *F03G 7/065* (2013.01)

(58) Field of Classification Search
   CPC ............ F02G 3/02; F01K 21/02; F01K 23/10; H01M 10/399; F02B 5/00
   See application file for complete search history.

(56) References Cited

U.S. PATENT DOCUMENTS

| 9,500,158 B1 * | 11/2016 | Anthony ................. F01K 21/02 |
| 2005/0257523 A1 * | 11/2005 | Proeschel ................ F02G 3/02 60/651 |
| 2013/0121847 A1 * | 5/2013 | Risla Nes ............... F02G 1/047 417/212 |
| 2013/0174532 A1 * | 7/2013 | Kaiho ..................... F02G 1/043 60/39.6 |
| 2016/0024924 A1 * | 1/2016 | Anthony ................. F01B 29/06 60/531 |

* cited by examiner

*Primary Examiner* — Shafiq Mian
(74) *Attorney, Agent, or Firm* — Frank L. Kubler

(57) ABSTRACT

A multi-stroke reciprocating thermal engine includes a cylinder head; a cylinder head cover; a crank case; crank shaft; a cam shaft; a cam cover; piston heads; and Shape Memory Alloy compression springs; a fluid tank; a radiator; a fluid pump; a heating fluid and a cooling fluid; a thermal battery with a thermal mass for storing thermal energy; a means of charging the thermal battery including a solar lens; electrical charging means and electromagnetic induction means.

25 Claims, 15 Drawing Sheets

SOLID STATE MULTI-STROKE THERMAL ENGINE

FILING HISTORY

This application continues from provisional patent application No. 62/766,383, filed on Oct. 15, 2018, and is a continuation-in-part of 14/545,996 filed on Jul. 15, 2015, application Ser. No. 13/506,943 filed on May 25, 2012, which is a continuation-in-part of application Ser. No. 12/380,626, filed on Mar. 2, 2009, issuing into U.S. Pat. No. 8,186.160 on May 29, 2012.

BACKGROUND OF THE INVENTION

1. Field of the Invention

The present invention relates generally to the field of thermal batteries and thermal engines using non-combustible fuels for storing thermal energy and reusing this energy at a later time. The field extends to the use of a shape memory alloys (SMA) for generating additional compressive forces on a piston head by phase changes in their composition. More specifically the present invention relates to a thermal engine that utilizes stored heat from a thermal mass to regenerate mechanical energy using phase changes in both non-combustible liquids and Shape memory alloys.

The present invention relates generally to the field of thermal batteries and thermal engines using non-combustible fuels for storing thermal energy and reusing this energy at a later time. The field extends to the use of shape memory alloys (SMA) for generating additional compression by phase changes in their composition. More specifically the present invention relates to a thermal engine that utilizes heat from a thermodynamic cycle to generate power from useable heat using SMA materials.

2. Description of the Prior Art

There previously have been thermal batteries and thermal fluids to drive engines using phase changes. These prior devices have had limited efficiency and usually have been impractical.

Shape memory Alloys or SMA for short refers to certain alloys of metals with the ability to "remember" a shape even after extensive cyclic deformations. If formed in a certain shape, they remain in that shape at room temperature. However, they become soft and undergo a phase transition of their internal molecular structure to a Martensite state. Once SMA springs are formed in a hot Austenite state as expanded compression springs, they will remember this shape when heated above the transition temperature. Once deformed in a lower than transition temperature state, the SMA spring will remain deformed in the Martensite state until heated above the transition temperature and then they return to the original Austenite state as expanded compression springs. The phenomenon is called shape memory effect (SME). Materials such as Nitinol, an alloy composed of a mix of 50% Nickel and 50% Titanium is very well known for its memory effects. By using this deformation of a preexisting shape and then reverting the alloy back to the original pre-deformed shape with heat, many engines have been created that run on very interesting principles such as linear belt deformation, spring deformation and so on.

Advantageously, the use of thermal batteries and thermal fluids to drive engines using phase changes is the subject of U.S. Pat. No. 8,186,160 and U.S. Pat. No. 9,500,158 B1 issued to the present inventor. In those inventions, thermal fluid under phase change when passed through a thermal battery that is used to store thermal energy. The thermal fluid undergoes a phase change and expands and drives a thermal engine. The thermal battery stores thermal energy for later use and as such the technology has the advantage of not needing an external energy source to drive the thermal engine. Such a solid state thermal battery can be used in conjunction with air and other fluids to drive solid state thermal engines according to the present invention. Prior inventions mentioned above granted to the present inventor further describe the use of reciprocation engines as thermal engine using a phase change in expansion fluids as the cooling fluids. Advantageously, additional power from the wasted energy of such thermal engines can be incorporated to perform solid state phase changes in metal alloys. Many devices have been invented using SMA materials. These inventions require a phase change of metal geometry excited by the placement of the alloy in a cold region as a deformed Martensitic alloy and then taken to a cold region to reform the original shape as an Austenite alloy. A combination of the thermal engine technology using the phase changes of a solid and liquid in combination thereof can allow the recovery of thermal energy from a thermal engine or a conventional reciprocating or rotary engine. The inventive aspect is in the combination of a single means to achieve both a solid state thermal engine and a fluidic thermal engine using the same components.

US patent #20120042646 A1, entitled "Method of cooling" by inventor Neil Tice, demonstrates a method of cooling SMA material below its transition point in a cool region, then deforming it and removing the SMA material to a region with a higher temperature than the transition point to activate its original shape, in a continuous cycle. The SMA material must be moved from one temperature region to another.

U.S. Pat. No. 4,450,686 A, entitled "Single Wire Nitinol Engine" awarded to Ridgway M. Banks shows a simple single wire Nitinol engine including a pair of levers, one of which reciprocates with respect to the other and is connected to a crank shaft by a connecting rod to transmit rotational energy from the reciprocating motion of the lever. A spring wound single nitinol wire is connected to the ends of the levers and a means is provided for immersing the wire alternately in hot and cold temperature baths. The Ridgeway Banks engine consists of a pair of levers, one being fixed against movement with respect to the other, the other being formed to have one end thereof reciprocate in straight line motion toward and away from said fixed lever, a nitinol wire formed in the configuration of a spring secured between the end of the reciprocating lever and the end of the fixed lever engages with said levers to also reciprocate the ends thereof to which the nitinol wire is attached between hot and cold temperature baths, a connecting rod interconnected between said reciprocating lever and a crank shaft whereby the reciprocating motion of the lever rotates said crank shaft. This device requires the dipping of the Nitinol elements into alternating baths of fluids to heat and cool them in a cyclic manner.

U.S. Pat. No. 4,302,938 A entitled "Nitinol engine for low grade heat" awarded to Yau T. Li consists of a continuous band of Nitinol wire wrapped in between a cluster of tightly engaged rollers to form a series of S-shaped bends. The principle involves a working medium such as water to convert low grade heat to mechanical power output. The band, together with the rollers, divides the space into an inner and an outer zone. A stream of warm water and a stream of cool water are guided to flow separately through one or the other of the two zones to make uniform and intimate contact with the segments of the Nitinol band alternatively at appropriate intervals. A well-defined four-cycle operation of temperature and stress is thus established and can convert a portion of the energy which is available in the thermal gradient of the two water streams into a mechanical shaft power which may be tapped from one of the rollers. The mechanism has the Nitinol in motion to enter the two temperature zones alternatively.

U.S. Pat. No. 4,010,612 A entitled "Thermal motor" awarded to Dante J. Sandoval describes a transducer that is belt-shaped and that is drivingly connected to several pulleys. Heat stimulus is applied to the belt locally adjacent at least one of the pulleys. The resultant straightening forces, inherent in an alloy such as nickel-titanium, cause rotation of the belt and hence the pulleys. His device comprises a plurality of rotatable means with at least one continuous belt drivingly engaging said rotatable means and being closely fitted thereabout to preclude slippage of the belt thereabout. The belt comprises a transducer adapted to alter its configuration to a relatively rigid preset configuration upon the application of heat and means of selectively applying heat to the belt whereby the belt configuration alteration causes rotatable elements to rotate. The invention requires continuous heat application and has the disadvantage of slippage as heat slowly raises the temperature of the belt over time. Further, the SMA material is moved in a continuous belt to bring it to the hot and the cold regions. The mechanism depends on the expansion and contraction of the SMA material due to temperature changes and tension of the belt acting upon it.

U.S. Pat. No. 4,117,680 entitled "Continuous loop shape memory effect heat engine," awarded to Ronald H. Smith, also describes a heat engine with a continuous band of thermally responsive shape memory material disposed in rolling engagement with one or more shafts. Below a transition temperature the band is ductile, but above that temperature the band tends to return abruptly to a shape impressed upon the band by heat treatment. The band is heated above and cooled below the transition temperature at points chosen to produce a force which imparts a rotation to at least one of the shafts. The apparatus consists of a thermal engine with a first and second relatively rotatable bodies having circular external and internal contours, respectively, said first body being positioned within said second body, a band of thermally responsive shape memory material constrained between the first and second bodies and tending to return generally to the internal contour of the second body when heated above a predetermined temperature, means for applying heat energy to the first body, and a flexible hand of thermally conductive material trained about the first body and engaging a portion of the band of shape memory material between the first and second bodies for transferring heat energy from the first body to the band of shape memory material.

U.S. Pat. No. 4,938,026 entitled "Heat engine based on shape memory alloys" awarded to David Goldstein describes an engine for converting radiated heat energy into mechanical energy comprising a tube made of sheet material with shape memory properties having axially extending corrugations thereon, a toothed roller in meshing engagement with said corrugations within a cold thermal region, a frame for establishing a pair of fixedly spaced axes and for rotatively positioning the tube and the roller on fixedly spaced axes restrictively exposing the corrugations to the radiated heat energy and producing a temperature differential with respect to the corrugations in a cold thermal region for inducing rotation of the tube and the roller about the fixed spaced axes. The invention depends on the corrugations flattening out and being reformed again when the SMA belt is cooled.

U.S. Pat. No. 4,996,842 A awarded to David Goldstein also describes an endless drive belt made of shape memory material is entrained about pulleys, one of which projects into a thermal heating region within which the drive belt undergoes contraction to form corrugations therein through which variable spaced contact is established with said one of the pulleys to induce rotation thereof and movement of the belt. The belt expands as it moves out of the thermal heating region causing the corrugations to flatten out as the belt approaches the other pulley.

All these inventions do not work in conjunction with a thermal battery and do not use an expanded fluid for generating pressure and vacuum fields within the cylinder expansion chamber. Further, they either use alternate deformation and reformation components working against one another to reset the power cycles, or the use thermal contraction of the SMA alloy to shorten and lengthen a belt made from SMA materials. The present invention uses the same SMA element to reset itself and also uses conventional thermodynamic power cycles to reset themselves for the cycles.

In a conventional engine, once the cooling fluid enters into the cylinder expansion chamber and expands, the energy of the expansion allows the piston to move a crankshaft and cause motion. However, the energy retained in the fully expanded fluid is unused and goes to waste. Further, in one embodiment of the present invention, a vacuum field formed inside the cylinder expansion chamber, causes abrupt cooling of the SMA springs of the present invent. A simple change in the cool valve allows air to be forced into the chamber by vacuum and also serves to cool the SMA springs after the heating expansive cycle is accomplished.

Commercially available Shape Memory Alloys, including nickel-titanium alloys have excellent performance, reliability, and strain recovery properties.

The present invention differs from all prior art by using a conventional multi-stroke engine to achieve both deformation, memory conversion and reshaping of the SMA material. Further, the drawbacks of current technology that rely on temperature changes of the SMA materials rely on either alternating periodic motion of the opposing SMA materials in the hot and cold regions to achieve deformation and reformation of one another. Most of these devices require a large exposure of the SMA material to a cooling zone that is proportionally far larger than the heating zone. They either use length of SMA material exposed to cooling instead of cooling time, or they use transport of SMA materials over a period of time in the hot and the cooling zones.

Thus the power of prior art devices is limited by the ratio of energy input versus energy removal from the SMA component. To achieve a fast temperature swing between cool region and the hot region, the present invention uses a thermal fluid such as air and vacuum fields to enter into the cylinder expansion chamber and do work on both the piston and the SMA material. Advantageously, during the heating cycle, a thermal battery can generate a lot of heated cooling fluid that can be drawn into the cylinder chamber by either a vacuum or by its own pressure motive force.

For example, if air is used as a working cooling fluid and heating fluid, with the apparatus 10 according to the first and second embodiments, then, during the first downward stroke of the invention, hot air can be pulled in by the expansion of the cylinder expansion chamber caused by the piston head without the need for a fluid pump. However, the fluid pump in this case can be a blower that sends cooling fluid as air into the thermal battery for heating fluid and into the exhaust manifold for cooling fluid. In such a case, the cooling fluid will pass through the exhaust manifold separately and through the thermal battery separately following the same path as described in the invention. The hot air can be as heating fluid used to expand the SMA spring from a compressed deformed cool Martensite state to an extended hot Austenite reformed state. This achieves some power generation that can be transmitted to a crank shaft. Further, by closing off both the exhaust valve and the intake valve, a vacuum formed within the cylinder expansion chamber can rapidly cool air therein and cause rapid cooling of the SMA spring.

So-called gas and combustible fluid engines are known that can operate with different types of fuels and are based on certain thermodynamic principles, such as the Diesel, Carnot, Rankine, and Otto cycles. In combustion engines an air-fuel mixture is compressed and then ignited. The compression results in an expansion of gases within the cylinder chamber, pushing a piston slidably retained within the cylinder in a repeated cycle to turn a crank shaft and so to generate mechanical power from the fuel. The current prior art engines therefore rely on combustible fuels that cause global pollution and health associated problems. In an effort to reduce the pollution and dependence on fossil fuels, several types of engines have been invented including electrically powered vehicles which rely on the storage of electric power in batteries.

While these vehicles are of current interest, a growing concern about the disposal of chemical batteries and the efficient global transformation of these new technologies to replace existing technologies has emerged. What is needed is a thermal engine design which adopts a philosophy of replacing or assisting existing technologies such as fossil fuel combustion engines and electric battery powered vehicles. Such a thermal engine as described by the present invention uses thermally generated power in a closed or open thermodynamic cycle to generate power without pollution. It also can be used in conjunction with conventional engines to improve their efficiencies without substantial change to current engine manufacturing technology.

It is thus an object of the present invention to provide an engine which can be operated with non-combustible cooling fluids which with a phase change to expand a fluid from a liquid phase to a vapor phase and generate power thereby achieve a high degree of efficiency during operation.

It is another object of the present invention to provide and thermal battery which can be used in conjunction as a thermal mass to store heat energy.

It is still another object of the present invention to provide a thermal engine with a thermal battery in which pressure is generated when a cooling fluid expands from a liquid state such as water to a gaseous phase such as steam, to power generate power.

It is a further objective of the present invention to disclose a thermal engine that is powered by a thermal battery causing a phase change of a shape memory alloy compression spring, to cause it to change its shape from a reformed extended Martensitic state to a deformed compressed Martensitic state by an intake valve and then heated by a heating fluid to a reformed extended Austenite state to impart a force on a piston in conjunction with a force exerted by a heating fluid on a piston head, and to then cool it again to a reformed extended Martensitic state to be changed again to a reformed compressed Martensitic state in a cyclic manner.

It is a further objective of the present invention to disclose a cyclic means of using an SMS compression spring with a variety of shapes and forms including but not limited to a compression spiral spring, a hyperboloid shaped spring, a multitude of straight rods and a multitude of compression spiral springs each having a memory as an extended state in the Austenite state such that when compressed in an extended Martensitic state they will deform in the Martensitic state and they will deform again in Martensitic state to be reformed as extended states in the Austenite state when heated above a transition temperature.

It is a further objective of the present invention to disclose a thermal engine that can be operated in a multi-stroke fashion as a solid state engine without a pressuring expanding medium.

It is a further objective of the present invention to disclose a thermal engine that can be recharged over a period of time by electric thermal heating means to store energy in a thermal battery, including a means using cartridge heater, a means induction coils a means using lasers, a means using plasma heating, a means using exhaust heat from a conventional engine.

It is finally an object of the present invention to provide an engine which is highly efficient and easy to operate and environmentally friendly.

Advantageously the thermal battery can be made from recyclable materials that have no adverse environmental effects. Advantageously, unlike electric batteries whose potential deteriorates with the number of charges, the thermal battery can be recharged with heat a large number of times without reducing its capacity to store heat energy, and without deterioration. Further, the thermal battery is environmentally safe and can be reused to manufacture new items by recycling its material without any consequences to the environment.

While the invention can be used only with a noncombustible phase change liquid such as water it may also be used in combination with or separately with a potentially combustible cooling fluid that have a high expansion value.

SUMMARY OF THE INVENTION

The present invention accomplishes the above-stated objectives, as well as others, as may be determined by a fair reading and interpretation of the entire specification.

In its most basic form, as mentioned above generally, the present thermal engine incorporates several conventional engine elements including a valve block cover; a valve block; a cylinder block; crank case; and a sump. The cylinder block has either one, or more cylinder expansion chambers within each of which a piston head is slidably and sealingly retained to form a variable volume cylinder expansion chamber between the piston head and the valve block. The valve block has an intake valve and exhaust valve either of which can be controlled for intake heating fluid and exhaust fluids respectively. The exhaust fluids can be both exhausted heating fluids and cooling fluids from the cylinder expansion chamber.

In the first and second embodiments of the invention, piston head wipers are provided as in a conventional engine to seat in groves that are formed around the periphery of the piston head. In the third embodiment of the invention, piston head seals are not required however wipers are provided as in a conventional engine to seat in groves that are formed around the periphery of the piston head. The piston seals form a seal between the piston head and the cylinder chamber hole.

For each of one of a single piston and a multiple piston configuration, the following method of assembly of the thermal engine is used.

A cylindrical piston pivot pin bushing hearing preferably made from oil impregnated brass material is inserted into the piston pivot pin hole through the underside of each piston head. One end of a connecting rod with a matching pivot connecting rod pin hole is attached to the piston pivot pin hole by a pivot pin to form a piston assembly. The piston assembly is inserted into evenly spaced cylinder chamber holes that pass through the cylinder block. The other end of the connecting rod has an open half round connecting rod bushing retainer that has an open half round connecting rod bushing as in a conventional engine. The crank shaft offsets are made to sit on the open half round connecting rod hushing bearings and then the crank shaft offsets are locked rotatively in place with half round connecting rod bearing cap that also have crank bushing bearings. The cylinder block has a half round crank bearing support to support the drive shafts of the crank shaft on half round crank hushing bearings. A crank case with a half round bearing is also provided to lock the crank shaft rotatably in place on a half round crank bushing bearing when the crank case is bolted to the cylinder block. A sump bolts to the open end of the crank case to form a closed engine assembly.

When the piston is at top dead center, the open end of the cylinder chamber hole forms a cylinder expansion chamber inside of which an SMA spring is placed to sit on each piston head. The inner face of the valve block has an exhaust valve seat and intake valve seat that are open into cylinder expansion chamber.

An exhaust valve has a valve stem that passes sealingly but slidingly through a small stem hole centrally located through the exhaust valve seat. When the exhaust valve sits on the exhaust valve seat, it forms a fluid seal and the exhaust valve stem projects through the valve stem hole some height above the valve block. A valve spring is provided and held in place around the valve stem with a valve spring clip at the top end of the exhaust valve stem to hold a compression valve spring in place. The valve spring clip holds the valve spring with a compressive force against the outer face of the valve block to hold the exhaust valve properly seated against the exhaust valve scat as in a conventional engine.

An intake valve has a valve stem that passes sealingly but slidingly through a small stem hole centrally located through the intake valve seat. When the intake valve sits on the intake valve seat, it forms a fluid seal and the intake valve stem projects through the valve block some height. A valve spring is provided and held in place with a valve spring clip at the top of the intake valve stem to hold a compression valve spring. The valve stem holds the valve spring with a compressive force against the outer face of the valve block to hold the intake valve properly seated against the intake valve seat as in a conventional engine.

The top ends of the valve block have half round cam shaft retainer with bearing seats to accept a cam shaft half-round bearing. A half round cam shaft bearing cap with a half round bearing is used to lock the cam shaft in place. The cam shaft has an intake cam lobe and an exhaust cam lobe for each piston head used. The intake cam lobe activates the intake valve and the exhaust cam lobe activates the exhaust valve periodically. The intake valve stem is designed to be long enough to fully compress the SMA spring from its extended state to its fully compressed state when the intake cam lobe is activated and pushes it down. intake valve should also have a wide enough valve face to fully contact the SMA spring.

In all embodiments of the present invention, the exhaust valve port fluidly connects to the exhaust manifold for removing heating fluid and alternatively for receiving and exhausting cooling fluid into the cylinder expansion chamber. The action of the exhaust valve is allowed to remove heating fluids from the cylinder expansion chamber into a radiator and alternately to allow cooling fluid from the cooling fluid tank to flow through the exhaust manifold through an exhaust manifold check valve to a radiator. Thus cooling fluid from the cooling fluid tank flow into the exhaust manifold can be tapped from the exhaust manifold into the cylinder expansion chamber. The exhaust manifold has an exhaust manifold check valve that only allows fluid flow to the radiator and not back from the radiator The intake manifold has intake valves that can bring in heating fluid into the cylinder expansion chamber to activate the SMA spring to extend to its reformed extended Austenite state therein and to generate a force. The heating fluid can be expanded gaseous fluid or heating fluid generated from cooling fluid by the thermal battery. The intake manifold fluidly connects through passages in the valve block to as many intake valve ports as required for receiving heating fluid from a thermal battery. The heating fluid can be expanded gaseous fluid or heating fluid generated from cooling fluid that flowed through a thermal battery.

The exhaust valve allows heating fluid to exit from the cylinder expansion chamber into the exhaust manifold. However, it also allows cooling fluid to enter into and out of the exhaust manifold from the cylinder expansion chamber as desired by each embodiment. The exhaust manifold fluidly connects through fluid passages in the valve block to exhaust valve ports for receiving cooling fluid from the cooling fluid pump and alternatively to allow the flow of either cooling fluid or heating fluid from the cylinder expansion chamber back to the exhaust manifold then to flow hack to the radiator.

The intake manifold brings receives heating fluid from the thermal battery to do thermodynamic work in the form of pressure expansion in the cylinder expansion chamber when allowed by the intake valve opening. This causes a thermal phase change extension of the SMA spring. Both processes involve phase changes. The heating fluid can be an expanded cooling fluid which has undergone a phase change from a liquid state to a gaseous state in the thermal battery and the SMA spring can undergo a phase change and become extended from a relaxed deformed compressed Martensite state to a reformed extended Austenite state to generate a force on a piston head.

The exhaust valve allows heating fluid and cooling fluid to exit from the cylinder expansion chamber but also allows cooling fluid to enter into the cylinder expansion chamber as desired by each embodiment.

The action of the exhaust valve is to allow cooling fluids in and out of the cylinder expansion chamber and also to allow both heating fluids and cooling fluids to exit from the cylinder expansion chamber and flow into a radiator.

Cooling fluid from a cooling fluid tank flows is pumped into the cylinder expansion chamber when the exhaust valve is open unless there is already pressurized heating fluid within the cylinder expansion chamber that must exit through the exhaust valve. Thus either cooling fluid, heating fluid or a combination of both can flow from the cylinder expansion chamber when the exhaust valve is open. The exhaust manifold has an exhaust manifold check valve that allows fluid flow out of the cylinder expansion chamber to go into a radiator. The exhaust manifold check valve does not allow flow back of fluids into the exhaust manifold from the radiator. A continuous flow of cooling fluid pumped by the cooling fluid pump passes from the cooling fluid tank into the exhaust manifold to enter the radiator through the exhaust manifold check valve. If the exhaust valve is open, either heating fluid that has done work exits into the exhaust manifold to the radiator, or cooling fluid will enter into the cylinder expansion chamber. This depends on whether a stroke is upward or downward.

An upward stroke minimizes the cylinder expansion chamber volume and can exhaust either cooling fluid or heating fluid or a combination of both from the cylinder expansion chamber.

A downward stroke maximizes the cylinder expansion chamber volume and can only pull cooling fluid into the cylinder expansion chamber. The flow of cooling fluid through the exhaust manifold to the radiator should be free from high back pressures so as not to introduce pressure on a piston head when a piston head is on an upward stroke.

The engine further comprises a cooling fluid pump that pumps cooling fluid to both the exhaust manifold check valve and a thermal battery. A teed output from the cooling fluid pump allows flow to the thermal battery and flow to the exhaust manifold.

The thermal battery consists of a contiguous thin walled thermal battery vacuum case within which is sealingly contained a thermal mass. The thermal mass has thermal battery passageways for transferring stored thermal energy to the cooling fluid by means of a thermal mass. Thermal battery passageways through a thermal mass are needed for uniform heating of the cooling fluid pumped by the cooling fluid pump to circulate therein. The thermal mass heats up the cooling fluid and if required expands the cooling fluid to a gaseous phase as an expanded heating fluid in the vapor form to transmit pressurized heating fluid into the intake manifold of the engine.

A pressure regulator fluidly connects to one output of cooling fluid pump that flows into the exhaust manifold to generate a hack pressure to ensure that the output of cooling fluid pump is under adequate pressure to maintain a set pressure build up in the thermal battery. Thus the cooling fluid flowing to the thermal battery is under a set maximum pressure. A pressure sensor senses the pressure of cooling fluid entering the thermal battery and turns off the fluid pump if the pressure is some measure above the set point of the pressure sensor. Thus the thermal battery must always have a heating fluid pressure that is below the set point of the pressure sensor but above the set point of the pressure regulator. Thus cooling fluid can flow through the pressure regulator when the thermal battery pressure is below the set point of the pressure sensor. Cooling fluid can flow into the exhaust manifold when the cool fluid pressure is above the set point of the pressure regulator but below the set point of the pressure sensor. Otherwise the cooling fluid pump shuts off. This way cooling fluid flows to both the pressure regulator and the thermal battery until the pressure in the thermal battery goes above the pressure setting of the pressure sensor and the cooling fluid pump shuts off.

If the pressure in the thermal battery is below the set point of the pressure regulator, more cooling fluid flows to the thermal battery to increase its pressure and the flow through the pressure regulator into the exhaust manifold is cut off to stop the cycle. In order for the flow of cooling fluid through the pressure regulator to be maintained, the flow through the exhaust manifold through the exhaust manifold check valve to the radiator should be at a pressure below the pressure regulator set point. This ensures that if a gaseous phase is used as heating fluid, any back up pressure from the radiator greater than the set point of the pressure regulator will be below the set point of the pressure sensor as well.

Only cooling fluid flow that is above the pressure build up in thermal battery and above the set point of the pressure regulator but below the set point of the pressure sensor goes into the exhaust manifold.

However, when the cooling fluid that has passed through pressure regulator enters the exhaust manifold its pressure is lower since it is freely flowing to either the radiator or into the cylinder expansion chamber.

In all embodiments of the present invention, SMA springs formed from shape memory alloys are provided to sit inside the cylinder expansion chamber between the piston head and the valve block of the thermal engine. The SMA springs are formed in the Austenite state as extended compressible springs. Thus when cooled they can be deformed to a compressed deformed Martensite state. Thus when heated they can be reformed into an extended Austenite state. A plurality of piston heads may be used with the invention. When the piston head is at top dead center in the cylinder expansion chamber, the SMA spring is designed with a specific diameter, height and shape to act as a compression spring and to sit snugly in the cylinder expansion chamber but in the relaxed extended Martensite state at room temperature. The SMA springs are designed to be in an Austenite state as fully extended compression springs. Thus when the pistons are at top dead center, the SMA springs have a minimal load to hold then snugly against the valve block and the piston head. Air and other thermally conductive fluids such as water, engine oil, and steam may be used with the invention as heating fluid and cooling fluid. Thus the apparatus can use combinations of heating fluids and cooling fluids of different types.

With the following definition, the intake cam lobe and the exhaust cam lobe are designed to achieve the following sequence in an all embodiment of the invention. The crank shaft position is at 0° top dead center (TDC) when the piston is at TDC.

The intake valve has an intake valve stem that keep the flow of heating fluid closed off until it is fully extended into the cylinder expansion chamber. At rest it forms a tight seal with the intake valve seat by means of the pressure of the valve spring. The intake valve has an intake cross hole diametrically through the intake valve stem, and positioned such that only when it is fully extended into the cylinder expansion chamber, the intake cross hole connects the intake manifold to the cylinder expansion chamber. Thus the intake valve does not allow heating fluid to enter into the cylinder expansion chamber until it is fully extended. The fully extended position when the intake cross hole can feed heating fluid into the cylinder expansion chamber is when the piston head is at 0° TDC.

The intake valve has a large contact area with the top of plane of the SMA spring when the piston head is at top dead center. The intake valve cam lobe can cut Off and turn On the intake of heating fluid into the cylinder expansion chamber. However, when activated by the intake cam lobe to do such, the intake valve has a valve stem that can project into the cylinder expansion chamber to compress the SMA spring when it is in a cool soft Martensite state.

When the piston head is at top dead center, the cylinder expansion chamber remains deep enough to accommodate the extended state of the SMA spring. The intake valve can project into the cylinder expansion chamber to compress the extended SMA spring when desired to do so. However, when the intake valve is closed and retracted, the total free height between the piston head and the valve block should be roughly but slightly less than the expanded length of the extended SMA spring to keep it snug.

First Embodiment of the Invention

In a first embodiment of the invention the heating fluid is preferably in vapor form having expanded from cooling fluid in the thermal battery under pressure. When an engine starting means turns the drive shaft, the cooling fluid pump delivers a quantity of cooling fluid from the cooling fluid tank and pumps it into the thermal battery to receive heat from the thermal mass causing the cooling fluid to become heating fluid. The heating fluid can be in vapor form but not necessarily. Some of the cooling fluid is bypassed through the pressure regulator into the exhaust manifold then flows through the exhaust manifold check valve to the radiator. If the intake valve is closed, this cooling fluid just circulates continuous loop back to the radiator through the exhaust manifold to be continuously cooled by the radiator to act as cooling fluid.

When the piston head is at 0° top dead center, the exhaust valve closes. The compressed SMA spring is already compressed in a Martensite state and the healing fluid enters through the intake valve cross hole and impinges upon the compressed SMA spring to heat it from a cool compressed Martensitic phase to an extended Austenite state and allow it to extend against the piston head and the valve block and at the same time the heating fluid enters into the cylinder expansion chamber and if in vapor phase expands and works in conjunction with the SMA spring to push the piston head in a first stroke toward bottom dead center to turn the crankshaft and produce motion. The rotation of the crankshaft during the first stroke causes the piston head to fall toward bottom dead center.

When the piston head is at about 10° after TDC, the cam shaft rotates and causes the intake cam lobe to retract the intake valve stem from the cylinder expansion chamber and the heating fluid flow from the intake manifold into the cylinder expansion chamber through the intake cross hole is cut off. The exhaust valve is still held closed.

At 180° from TDC, the piston head starts to rise again in a second upward stroke toward top dead center. The intake

| PISTON POSITION RELATIVE TO CRANK SHAFT ANGLE POSITION (positions are only examples) | SMA spring state | Intake valve state | Exhaust valve state |
|---|---|---|---|
| 10° before TDC | Martensite deformation compression Phase | Intake valve pushes SMA to compress it. No heating fluid flows. | Exhaust open to let out prior cycle cooling fluid. |
| 0° TDC | Austenite Reformation Extension phase | Intake valve opens to let in heating fluid to heat SMA and extend it. | Exhaust closes. |
| 10° after TDC | Austenite Reformation Extension phase completed | Intake valve fully retracted. No heating fluid flows. | Exhaust closed. |
| 180° after TDC | Austenite Reformation Extension phase | Intake closes. | Exhaust opens to let out heating fluid |
| 360° TDC | Martensite Reformation Extended phase | Intake closed | Exhaust closes to form a cooling vacuum. |
| 540° after TDC | Martensite Reformation Extended phase | Intake closed | Exhaust opens to let in cooling fluid. |
| 710° after TDC | Martensite deformation compression Phase | Intake valve pushes SMA to compress it. No heating fluid flows | Exhaust open to let out prior cycle cooling fluid. |
| 0° TDC cycle repeats | Austenite Reformation Extension phase | Intake valve opens to let in heating fluid to heat SMA and extend it. | Exhaust closes. |

In the start configuration, the SMA spring is in an extended and relaxed Martensite at 10° before TDC. The cam shaft exhaust lobe keeps the exhaust valve open to exhaust cooling fluid from the cylinder expansion chamber from a previous cycle.

When the piston head is at about 10° before TDC, the cam shaft rotates and causes the intake cam lobe to push the intake valve stem and project it into the cylinder expansion chamber to compress the SMA spring while it is still soft in the Martensite state against the rising piston head.

valve is closed and the cam shaft causes the exhaust cam lobe to push and open the exhaust valve to exhaust heating fluid from the cylinder expansion chamber. The hot exhausted expanded fluid is transported through the exhaust manifold that allows fluid flow only in one direction to a radiator. At the radiator a fan cools the heating fluid by passing ambient air through the radiator fins. The heating fluid then cools and if a gas condenses to be pumped back by a condensate pump to the cooling fluid tank as cooling fluid for reuse.

At 360° from top dead center the third downward stroke begins. The intake cam lobe keeps the intake valve closed and the cam shaft causes the exhaust cam lobe to close off the exhaust valve. Since there is nowhere for fluid to enter the cylinder expansion chamber during the third downward stroke, a vacuum is formed and this cools the cylinder expansion chamber to cool the SMA spring into a Martensite state as an extended spring.

At 540° from top dead center the fourth and final upward stroke begins. The cam shaft causes the intake cam lobe to keep the intake valve closed and the exhaust cam lobe to open the exhaust valve. The vacuum that was formed in the prior third downward stroke exists in the cylinder expansion chamber and is now relieved by cooling fluid entering through into the expansion cylinder chamber through the exhaust manifold. This allows cooling fluid from the cooling fluid tank to flow into the cylinder expansion chamber as it minimizes to TDC to further cool the SMA spring into the extended Martensite state.

At 710° from top dead center the cycle begins again and the cam shaft causes the intake cam lobe to push open the intake valve and project it into the cylinder expansion chamber to compress the expanded SMA spring against the rising piston head. The cycle is repeated until it is stopped by simply closing of the supply of expanded fluid to the intake valve.

Second Embodiment of the Invention

In a second embodiment of the invention the heating fluid is preferably in vapor form having expanded from cooling fluid in the thermal battery under pressure. When an engine starting means turns the drive shaft, the cooling fluid pump delivers a quantity of cooling fluid from the cooling fluid tank and pumps it into the thermal battery to receive heat from the thermal mass causing the cooling fluid to become heating fluid. The heating fluid can be in vapor form but not necessarily. Some of the cooling fluid is bypassed through the pressure regulator into the exhaust manifold then flows through the exhaust manifold check valve to the radiator. If the intake valve is closed, this cooling fluid just circulates continuous loop hack to the radiator through the exhaust manifold to be continuously cooled by the radiator to act as cooling fluid.

| PISTON POSITION RELATIVE TO CRANK SHAFT ANGLE POSITION (positions are only examples) | SMA spring state | Intake valve state | Exhaust valve state |
| --- | --- | --- | --- |
| 10° before TDC | Martensite deformation compression Phase | Intake valve pushes SMA to compress it. No heating fluid flows. | Exhaust open to let out prior cycle cooling fluid. |
| 0° TDC | Austenite Reformation Extension phase | Intake valve opens to let in heating fluid to heat SMA and extend it. | Exhaust closes. |
| 10° after TDC | Austenite Reformation Extension phase completed | Intake valve fully retracted. No heating fluid flows. | Exhaust closed. |
| 180° after TDC | Austenite Reformation Extension phase | Intake closes. | Exhaust opens to let out heating fluid |
| 360° TDC | Martensite Reformation Extended phase | Intake closed | Exhaust opens to draw in more cooling fluid. |
| 540° after TDC | Martensite Reformation Extended phase | Intake closed | Exhaust opens to let out cooling fluid. |
| 710° after TDC | Martensite deformation compression Phase | Intake valve pushes SMA to compress it. No heating fluid flows | Exhaust is still open to let out prior cycle cooling fluid. |
| 0° TDC cycle repeats | Austenite Reformation Extension phase | Intake valve opens to let in heating fluid to heat SMA and extend it. | Exhaust closes. |

In the start configuration, the SMA spring is in an extended and relaxed Martensite at 10° before TDC. The cam shaft exhaust lobe keeps the exhaust valve open to exhaust cooling fluid from the cylinder expansion chamber from a previous cycle.

When the piston head is at about 10° before TDC, the cam shaft rotates and causes the intake cam lobe to push the intake valve stem and project it into the cylinder expansion chamber to compress the SMA spring while it is still soft in the Martensite state against the rising piston head.

When the piston head is at 0° top dead center, the exhaust valve closes. The compressed SMA spring is already compressed in a Martensite state and the heating fluid enters through the intake valve cross hole and impinges upon the compressed SMA spring to heat it from a cool compressed Martensitic phase to an extended Austenite state and allow it to extend against the piston head and the valve block and at the same time the heating fluid enters into the cylinder expansion chamber and if in vapor phase expands and works in conjunction with the SMA spring to push the piston head in a first stroke toward bottom dead center to turn the crankshaft and produce motion. The rotation of the crankshaft during the first stroke causes the piston head to fall toward bottom dead center.

When the piston head is at about 10° after TDC, the cam shaft rotates and causes the intake cam lobe to retract the intake valve stem from the cylinder expansion chamber and the heating fluid flow from the intake manifold into the cylinder expansion chamber through the intake cross hole is cut off. The exhaust valve is still held closed.

At 180° from TDC, the piston head starts to rise again in a second upward stroke toward top dead center. The intake valve is closed and the cam shaft causes the exhaust cam lobe to push and open the exhaust valve to exhaust heating fluid from the cylinder expansion chamber. The hot exhausted expanded fluid is transported through the exhaust manifold that allows fluid flow only in one direction to a radiator. At the radiator a fan cools the heating fluid by passing ambient air through the radiator fins. The heating fluid then cools and if a gas condenses to be pumped back by a condensate pump to the cooling fluid tank as cooling fluid for reuse.

At 360° from top dead center the third downward stroke begins. The intake cam lobe keeps the intake valve closed and the cam shaft causes the exhaust cam lobe to keep open the exhaust valve. Since the exhaust valve is open, the free flow of cooling fluid enters the cylinder expansion chamber during the third downward stroke and is pulled in by the piston head. This cools the cylinder expansion chamber to cool the SMA spring into an extended Martensite state as an extended spring.

At 540° from top dead center the fourth and final upward stroke begins. The cam shaft causes the intake cam lobe to keep the intake valve closed and the exhaust cam lobe to keep open the exhaust valve. The cooling fluid from the cylinder expansion chamber and is now relieved by entering into the exhaust manifold.

At 710° from top dead center the cycle begins again and the cam shaft causes the intake cam lobe to push open the intake valve and project it into the cylinder expansion chamber to compress the expanded SMA spring against the rising piston head. The cycle is repeated until it is stopped by simply closing of the supply of expanded fluid to the intake valve.

Third Embodiment of the Invention

In a third embodiment of the invention the heating fluid is preferably in liquid form having being heated from cooling fluid in the thermal battery. When an engine starting means turns the drive shaft, the cooling fluid pump delivers a quantity of cooling fluid from the cooling fluid tank and pumps it into the thermal battery to receive heat from the thermal mass causing the cooling fluid to become heating fluid. Some of the cooling fluid from the cooling fluid tank is bypassed through the pressure regulator into the exhaust manifold then flows through the exhaust manifold check valve to the radiator. If the intake valve is closed, this cooling fluid just circulates continuous loop back to the radiator through the exhaust manifold to be continuously cooled by the radiator to act as cooling fluid.

In this embodiment, fluids can freely pass through the piston head and fall into the sump without little hindrance. The piston head has large openings to let through fluids.

| PISTON POSITION RELATIVE TO CRANK SHAFT ANGLE POSITION (positions are only examples) | SMA spring state | Intake valve state | Exhaust valve state |
| --- | --- | --- | --- |
| 10° before TDC | Martensite deformation compression Phase | Intake valve pushes SMA to compress it. No heating fluid flows. | Exhaust open to let in cooling fluid. |
| 0° TDC | Austenite Reformation Extension phase | Intake valve opens to let in heating fluid to heat SMA and extend it. | Exhaust closes. |
| 10° after TDC | Austenite Reformation Extension phase completed | Intake valve fully retracted. No heating fluid flows. | Exhaust closed. |
| 180° after TDC | Austenite Reformation Extension phase | Intake closes. | Exhaust opens to let out cooling fluid |
| 360° TDC | Martensite Reformation Extended phase | Intake closed | Exhaust open to let in cooling fluid.. |
| 540° after TDC | Martensite Reformation Extended phase | Intake closed | Exhaust open to let in cooling fluid. |

-continued

| PISTON POSITION RELATIVE TO CRANK SHAFT ANGLE POSITION (positions are only examples) | SMA spring state | Intake valve state | Exhaust valve state |
| --- | --- | --- | --- |
| 710° after TDC | Martensite deformation compression Phase | Intake valve pushes SMA to compress it. No heating fluid flows | Exhaust open to let in cooling fluid.. |
| 0° TDC cycle repeats | Austenite Reformation Extension phase | Intake valve opens to let in heating fluid to heat SMA and extend it. | Exhaust closes. |

In the start configuration, the SMA spring is in an extended and relaxed Martensite at 10° before TDC. The cam shaft exhaust lobe keeps the exhaust valve open to let in cooling fluid from the exhaust manifold into the cylinder expansion chamber to cool the SMA spring.

When the piston head is at about 10° before TDC, the cam shaft rotates and causes the intake cam lobe to push the intake valve stem and project it into the cylinder expansion chamber to compress the SMA spring while it is still soft in the Martensite state against the rising piston head.

When the piston head is at 0° top dead center, the exhaust valve closes. The compressed SMA spring is already compressed in a Martensite state and the heating fluid enters through the intake valve cross hole and impinges upon the compressed SMA spring to heat it from a cool compressed Martensitic phase to an extended Austenite state and allow it to extend against the piston head to push the piston head in a first stroke toward bottom dead center to turn the crankshaft and produce motion. The rotation of the crankshaft during the first stroke causes the piston head to fall toward bottom dead center. Heating fluid simply falls into the sump where it is collected with cooling fluid and sucked into the cooling fluid tank.

When the piston head is at about 10° after TDC, the cam shaft rotates and causes the intake cam lobe to retract the intake valve stem from the cylinder expansion chamber and the heating fluid flow from the intake manifold into the cylinder expansion chamber through the intake cross hole is cut off. The exhaust valve is still held closed.

At 180° from TDC, the piston head starts to rise again in a second upward stroke toward top dead center. The intake valve is closed and the cam shaft causes the exhaust cam lobe to push and open the exhaust valve to allow cooling fluid to enter into the cylinder expansion chamber. The cooling fluid flows through the exhaust manifold into the cylinder expansion chamber to fall to the sump where it is collected to he pumped hack to the cooling fluid tank.

At 360° from top dead center the third downward stroke begins. The intake cam lobe keeps the intake valve closed and the cam shaft causes the exhaust cam lobe to keep open the exhaust valve. Since the exhaust valve is open, cooling fluid enters the cylinder expansion chamber during the third downward stroke and cools the cylinder expansion chamber to cool the SMA spring into an extended Martensite state as an extended spring.

At 540° from top dead center the fourth and final upward stroke begins. The cam shaft causes the intake cam lobe to keep the intake valve closed and the exhaust cam lobe to keep open the exhaust valve. The cooling fluid still flows into the cylinder expansion chamber through the piston head and into the sump.

At 710° from top dead center the cycle begins again and the cam shaft causes the intake cam lobe to push open the intake valve and project it into the cylinder expansion chamber to compress the expanded SMA spring against the rising piston head. The cycle is repeated until it is stopped by simply closing of the supply of expanded fluid to the intake valve.

The sump has a mixture of cooling fluid and heating fluid and thus will generally need to be cooled again by a radiator to bring it to below the transition temperature of the SMA spring. Advantageously in the third embodiment, the cooling fluid may be a suitable oil, water, a 50% to 50% mixture of water and ethylene glycol. Such a fluid must have good thermodynamic thermal storage capacity and act as both a good heat source for the activation of the SMA spring and for cooling the same. Further, the engine block may be cooled by the cooling fluid without need for cooling passages through the engine block. Advantageously a lubricating oil may also be added to the cooling fluid for the third embodiment.

The SMA spring has several possible embodiments that are obvious. For example, a multitude of thin wire springs could be formed in a concentric axial alignment to perform the same function. Further, as shown in FIGS. 7, 8, 9, 10, 11 and 14, a compression spring, a multitude of compression springs, wire struts and a leaf spring configuration with multiple leaves arranged in a hyperboloid profile could be used. The compression force ratio between the Austenite state and the Martensite state is about 4-1. Thus the SMA spring wire should have adequate thickness to generate a substantial force. The cross-sectional area of the SMA springs basically determines it will exert when extended. Thus the more the power needed, the greater the total cross-sectional area of the SMA spring needed.

Further if advantageously the hot cooling fluid used in the third embodiment is cooled by the radiator and reused, the wasted heat from a plant can be used to run the thermal engine. Further, the third embodiment can be used to power a generator or other devices in vehicles. For example, if the wasted exhaust heat from a combustion engine is used to heat the hot cooling fluid, then the cooled coolant can be used as the cooling fluid.

Both contraction and relaxation of the SMA spring are virtually instantaneous with the temperature of wire it is made from. As a result, actual cycle speed of the process of expansion and contraction depends on temperature changes of the wire.

The piston head motion generates a force transmitted by the piston connecting rod connector to turn the crankshaft and generate mechanical power using the thermodynamic potential of the expanded fluid vapor and the thermodynamic potential of a metal or just a metal as in the third embodiment. In the first and the second embodiments, heating fluid exits through exhaust valve into the exhaust manifold for removal into a radiator where it is cooled.

The valve operating means preferably includes a camshaft and push rods but alternatively an electronic solenoid cylinder valve actuation means can be used to perform the same function.

In general operation of the apparatus, heat is generated and stored in the thermal mass by one of several means. The first preferred means is by passing electric current through resistive heating elements embedded in the thermal mass for a period of time and the second alternative means is by imposing radiation heater elements such as from infrared heating elements embedded in the thermal mass, and the third preferred means is by using electromagnetic induction heating means on the thermal mass for a period of time, and the fourth preferred means for special approved applications is by using a radiative element such as thorium to continuously heat the thermal mass. A predetermine amount of the cooling fluid to flow through a flow regulator and then into the cooling fluid passageways.

Advantageously, the third embodiment could be used with other types of engines to perform functions such as to power a radiator fan to remove heat from an engine.

The present thermal engine may be used for powering a vehicle, a train or other devices, including a cylinder and a piston having a piston head and a piston crank and an insulated thermal battery including at least a thermal mass such as a metal block for storing and retaining heat to cause heating fluid to expand inside a cylinder expansion chamber between the cylinder head and the piston head to drive a crankshaft.

Since the anticipated operating temperature of the thermal cooling fluid depends on it boiling point, except for the thermal battery, the remaining thermal engine can be constructed from durable materials such as aluminum and a suitable plastic material such as polypropylene or peek. In its most basic form, as mentioned above generally, the thermal engine incorporates several conventional engine elements including valve cover sealingly mated to a valve block sealingly mated to an engine block with a crank case that is sealingly mated to a sump. These components of the thermal engine could be injection molded from suitable plastics and then lined with stainless steel inserts in areas where wear might be a problem.

The engine block has one or more longitudinal spaced cylinder chambers bored through it with axes perpendicular to its open face within each of which a piston head is slidably and sealingly retained to form a variable volume cylinder expansion chamber between the piston head and the valve block. The other end of the engine block is sealingly connected to thin walled crankcase. The anticipated operating temperature of the engine block, the valve cover, the valve block, the crankcase, the sump and the piston head is below the melt point of most plastics and so these components could be constructed from durable materials such as aluminum allows, plastics such as Peek, Vespel® SP-1 Polyimide, Meldin® 7001 Polyimide, Kapton® Polyimide, Kaptrex® Polyimide, Torlon® 4203, Vestakeep® PEEK, CeramaPEEK®, Ryton®-PPS-40% Glass-Filled and Celazole® PBI. Celazole® PBI offers the highest heat resistance and mechanical property retention over 400° F. well above the boiling point of water. The cylinder chamber could be lined with stainless steel sleeves to prevent wear due to the sliding motion of the piston head.

The thermal mass chamber surrounds the thermal mass and the thermal battery vacuum case surrounds the thermal mass chamber so that a vacuum can be pulled in the thermal battery vacuum case to surround the thermal mass chamber and insulate it from convective heat loss. Sealed heat transfer fluid passageways fluidly connect the thermal mass chamber to the cooling fluid pump to circulate cooling fluid within and through the thermal mass chamber for uniform heating.

The thermal battery vacuum chamber, the thermal mass, the thermal mass chamber, the heat transfer fluid passageways and the expansion chamber must all be constructed from durable high melting point materials such as stainless steel, titanium or ceramics. The thermal battery vacuum case must he made from heat resistant and low expansion materials such as ceramics and metal allows. It cannot be made from plastic or aluminum since it must withstand very high temperatures.

A flywheel is attached to the drive shaft connected to one end of the crankshaft preferably extends out of the crankcase through a shaft port to transmit the thermal engine power in the form of torque to any desired mechanical load such as the cooling fluid pump, and a generator for recharging a battery.

The thermal engine is started by the engine starter switch. Thus sends power to an electric engine starter and causes it to rotate the drive shaft connected to turn a crankshaft. It is preferable that an electric cooling fluid pump be used so that it can be started and turned off by the engine starter switch. If the cooling fluid pump is driven by the engine crankshaft and since the speed of the engine can influence the speed of the cooling fluid pump, the engine power can exponentially decay if it slows down and then slows cooling fluid pump as well. Thus, preferably, the cooling fluid pump should be electric driven and made independent of the engine crankshaft motion.

The thermal mass can be constructed with multiple layers of metal slabs so that it is easier to handle and easier to conform to the space requirements of a vehicle. In one preferred embodiment, the thermal mass is constructed from long solid cylindrical mass with an outer thin walled cylindrical shell that allows the passage of cooling fluid between the solid cylinder and the outer thin walled cylindrical shell.

The thermal mass can be made from a single casting with all the required passages already configured within it for the heat transfer fluid and the heating means. Thermal insulation surrounds the thermal battery vacuum case to insulate and prevent loss of heat energy to the environment. Preferably, the thermal insulation is made from such as polyamides and ceramics fiber materials that can withstand extremely high temperatures. Such materials are available as wrap around tapes from companies such as Engineered Tapes Inc., and ABS Thermal Technologies in New York. The thermal mass is preferably made from stainless steel and metal alloys, but can also be made from ceramics, silicates, clays or carbon compounds. Preferably a dense material with a high heat storage capacity should be used to achieve a high storage heat capacity in the thermal mass. Such dense materials that may be used for a thermal mass include iron, lead, stainless steel, titanium, aluminum, molten salts, carbon composites, fiber glass composites and ceramics. The heat energy storage density is a function of the density of the material since the mass is a function of the density. Examples of the heat storage density of some materials are shown in the table below:

| Material | Heat storage density kJ/m³ ° C. | Operating temperature range, ° C. |
|---|---|---|
| Aluminum | 2484 | 680 |
| Cast Iron, Stainless Steel, | 3889 | 1151 |
| Ceramics | 2800 | 2000 |
| Taconite | 2500 | 2000 |
| Saltstream ™ 565 | 1960 | 565 |

The cooling fluid tank should he made from durable water and pressure resistant materials such as Aluminum, Stainless steel or Fiberglass including Carbon. Since the cooling fluid tank can be pressurized in some instances, it must be designed to hold adequate pressure and its construction should follow adequate guidelines for manufacture of pressure tanks of the required pressure ratings.

The engine block and engine components can be constructed from metal alloys commonly used in the manufacture of standard combustion engines. However, since the thermal loads that the thermal engine is subjected to can be far less that regular combustion engines, it is possible to construct the engine components from aluminum alloys, ceramics, plastics and even carbon fiber materials. If water is used as a cooling fluid, it is even possible to manufacture the engine and its components using high temperature engineering plastics such as mentioned earlier. The design of the cylinders in the cylinder head could be augmented by inserting stainless steel sleeve cylinders to prevent the wear of the plastic due to the friction of the piston head sliding on the cylinder walls.

Advantageously, the use of engineering plastics could make the thermal engine as light as possible to compensate for the additional weight that is needed for the thermal battery. Some other components of the thermal engine such as the cams and the camshaft could also be made from adequate engineered plastics that can withstand mechanical loads and heat. In all the cost of manufacture of the thermal engine can be reduced considerably by a suitable choice of materials.

The engine starter is mechanically coupled to the drive shaft by either a gear or a pulley and belt. The engine starter is preferably an electric starter of conventional design that is operated by an electric battery. It could also be an air pressure starter or a rope starter similar to conventional pull rope starters used for small combustion engines. In the case when there arc multiple piston heads and cooperating cylinders incorporated into the thermal engine, the power stroke of at least one piston head is opposed to the exhaust vacuum stroke of another piston head.

The engine can be a two or four-stroke engine. Every intake valve port is in common fluid communication with the intake chamber and so any intake valve that is open will immediately transmit the heating fluid into the cylinder expansion chamber to push its corresponding piston head. Every exhaust valve port is in common fluid communication with the exhaust chamber and so any exhaust valve that is open will immediately transmit the heating fluid into or out of the cylinder expansion chamber. Further, a cooling fan may be optionally attached to the output drive shaft to cool the engine and to cool heating fluids exhausted into the radiator.

The thermal engine includes a heating means including at least an infrared heater, and alternatively, a resistance heating element extending into the thermal mass and a resistance healing element circuit; a power connector for delivering electric current through the at least one heating means and thereby heating the thermal mass. Alternatively, the thermal mass heating means includes an electromagnetic induction heating means to heat the thermal mass by inductive heating; said electromagnetic induction heating means either may he incorporated as part of the thermal mass or may be a separate unit from the thermal mass so that the thermal mass may be heated quickly and non-intrusively by an external electric power source. The external electromagnetic induction heating means may be an induction coil proximally placed to heat the thermal mass without any contact with the thermal mass, so that in the event that the thermal engine is installed in a vehicle or mobile device, the thermal mass can be heated quickly by just passing through the vehicle or mobile device through the electromagnetic field of such the electromagnetic induction heating means without contact. The Infrared heating bulbs can be used to directly heat the thermal mass by radiation. Such heaters arc readily available from companies like Dykast Inc. Watlow™ 1/32 Din digital Temperature controller can be used to control the temperature of the thermal and preferably Avatar™ 60 Amp SCR for switching 10 kW load with 2 second soft start and voltage limitation controllers can be used to control the thermal heating means such as the infrared heaters.

It is important that the intake chamber be insulated as much as possible so that the heating fluid retains as much heat as possible before it is introduced into the cylinder expansion chamber. It is important that the exhaust chamber not be insulated so that as much heat can be taken out of the mixtures of cooling fluid and exhausted heating fluid from the exhaust. The thermal engine preferably operates on a noncombustible cooling fluid such as water or a refrigerant fluid; it is important that the cooling fluid have as high a heat of vaporization as possible. Water and refrigerants such as ammonia have the highest heat of vaporization per kilogram. In accordance with the present invention, a thermally charged thermal battery is used to generate mechanical energy by a phase change of a solid SMA member and or a liquid such as water.

SMA springs can be obtained from Kellogs Research Inc., SAES Getters Group, Dynalloy Inc., FlexMet in the UK, and many other places.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
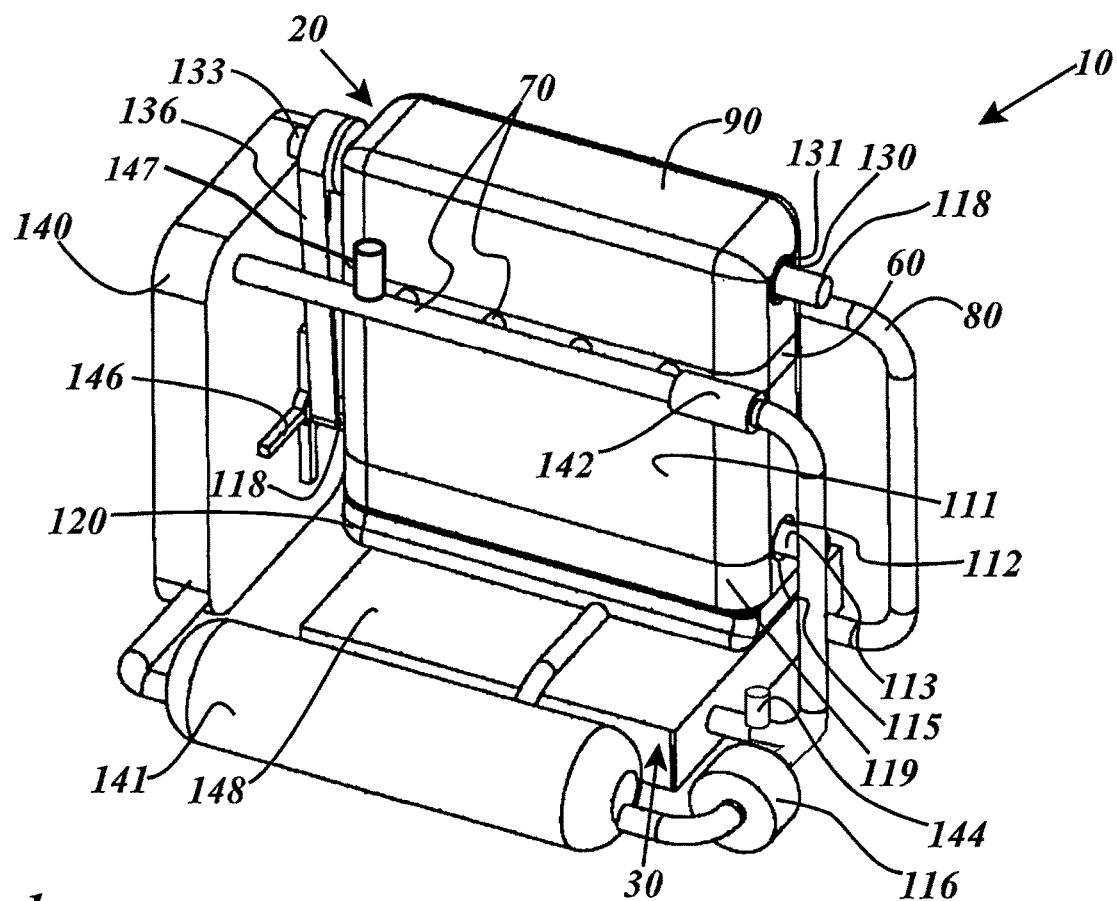
FIG. 1 shows the thermal engine according to a first second and third embodiments of the invention with a thermal battery attached directly to the hot intake manifold and a cooling fluid pump pumping cooling fluid to the exhaust chamber and the thermal battery. The figure also shows the exhaust manifold, cooling fluid tank, the cooling fluid pump, the exhaust manifold check valve, the thermal battery, the radiator, the fan, the pressure sensor switch and the pressure regulator.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

Figure 2:
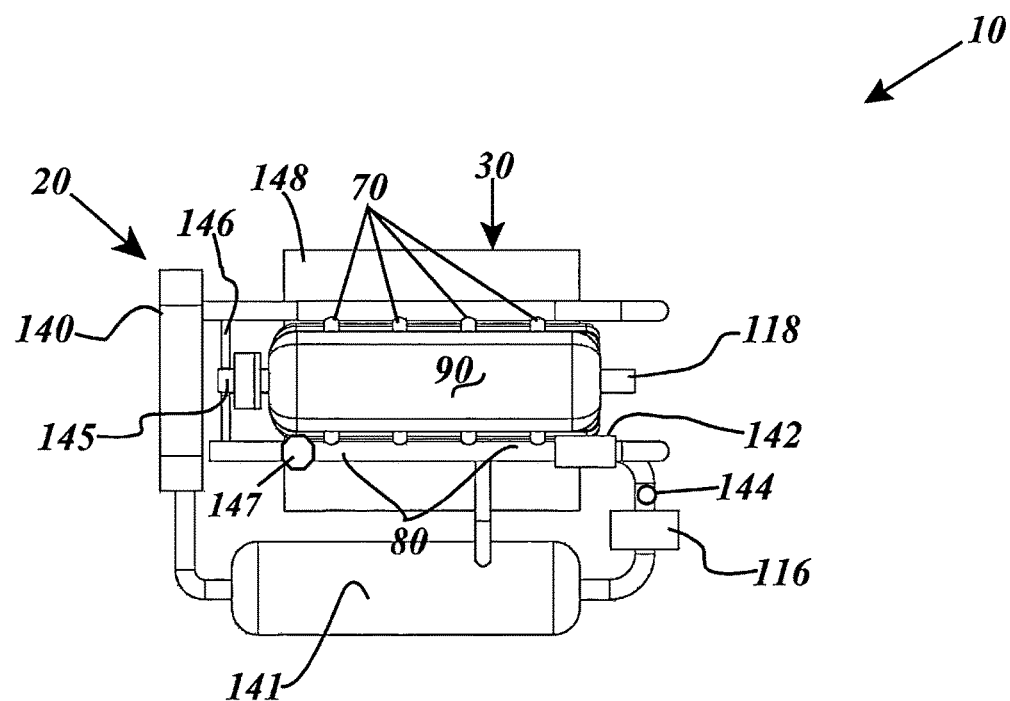
FIG. 2 shows a top view of the thermal engine according to all the embodiments of the invention with the cam cover shown. The figure also shows the intake manifold, the exhaust manifold, cooling fluid tank, the cooling fluid pump, the exhaust manifold check valve, the thermal battery, the radiator, the fan, the pressure sensor switch and the pressure regulator.
Figure 3:
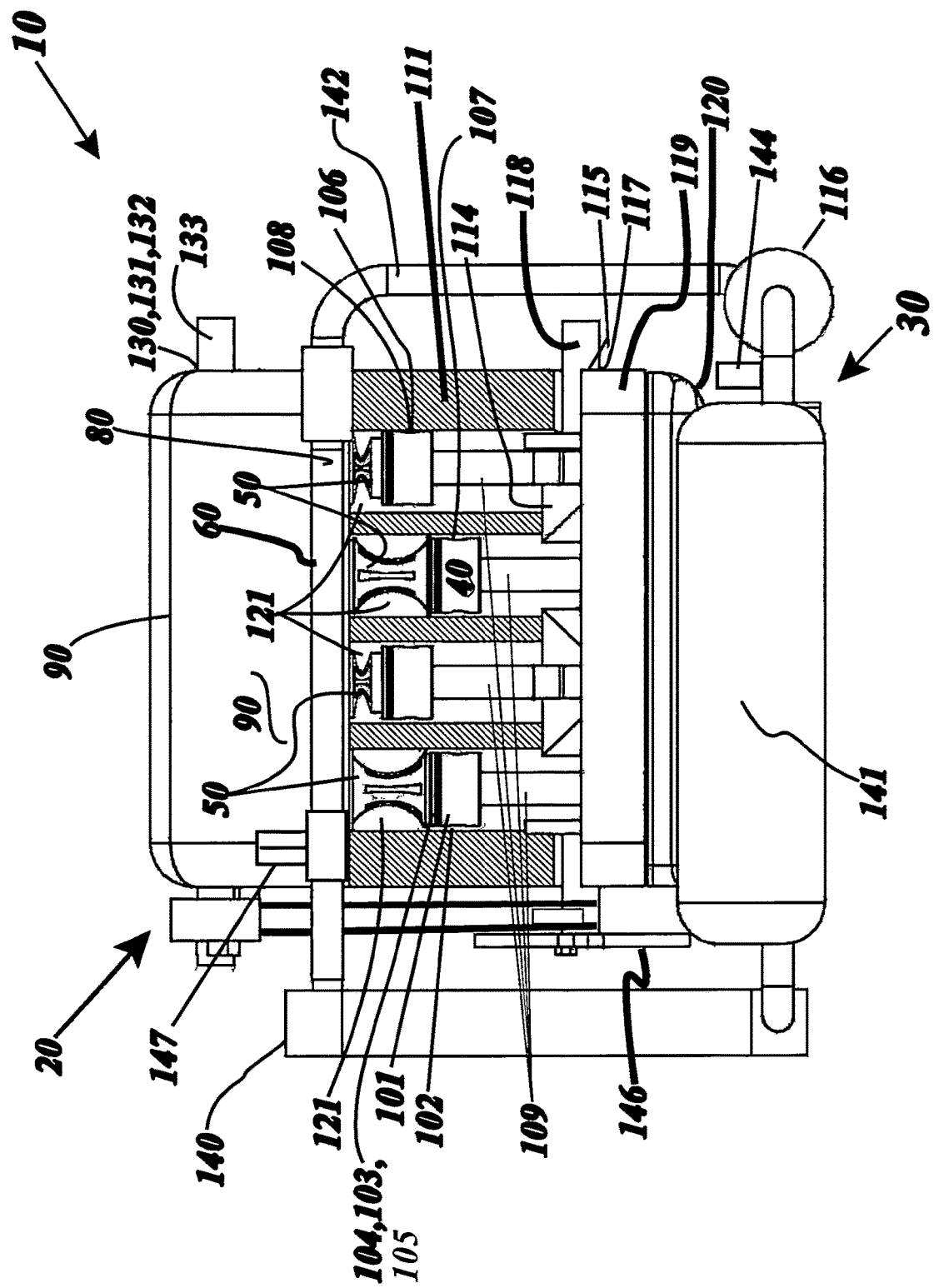
FIG. 3 shows a cross sectional view of the cylinder block according to a first embodiment of the invention with the cam cover in place. The pistons are shown in a relative configuration of upward stroke and downward stroke with the SMA spring extended and compressed. Parts of the crank shaft are shown.
Figure 4:
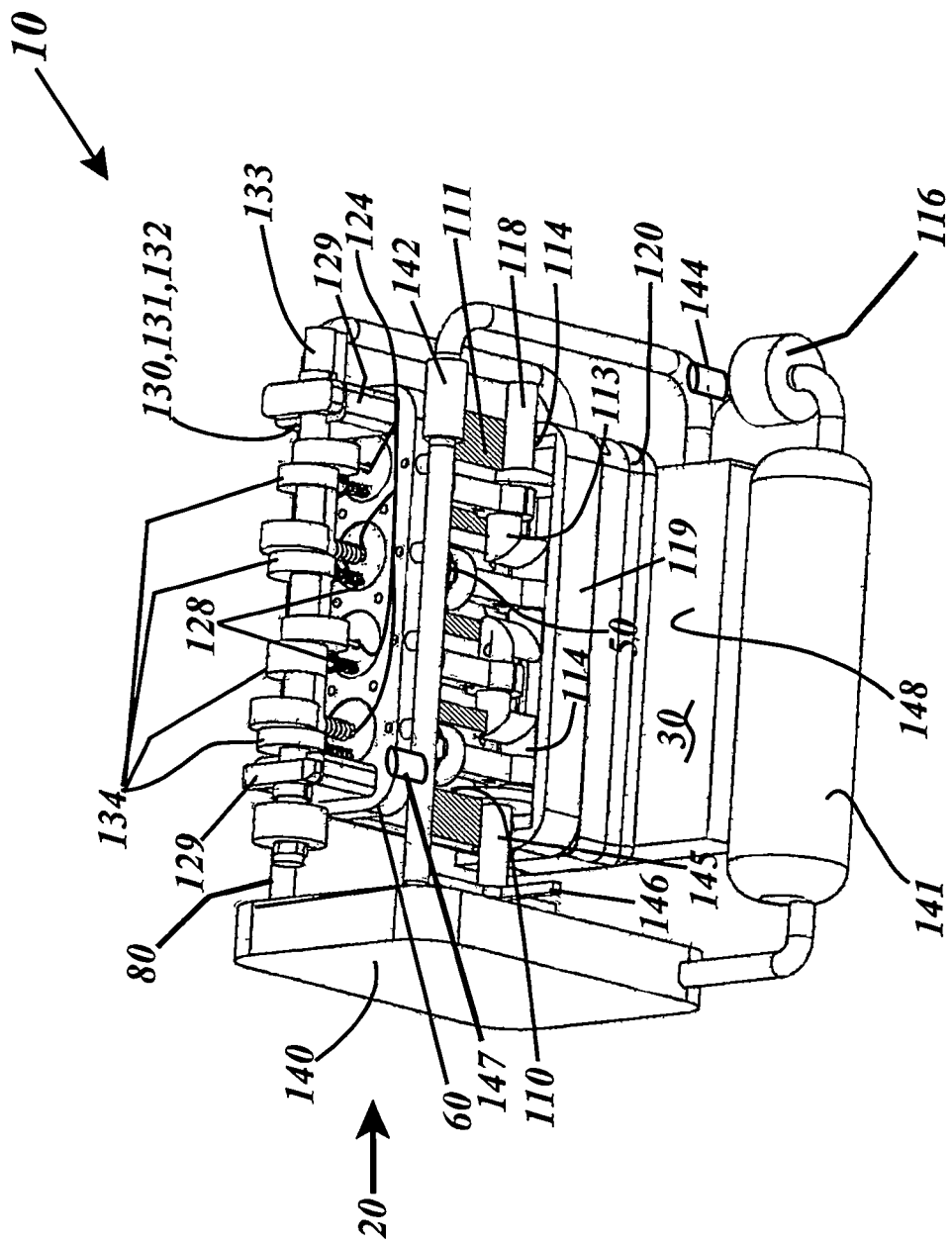
FIG. 4 shows the thermal engine with the cam cover removed to show details of the cam shaft, cam lobes, valve stems. The figure also shows details of the exhaust manifold, the cooling fluid tank, the cooling fluid pump, the exhaust manifold check valve, the thermal battery, the radiator, the fan, the pressure sensor switch and the pressure regulator.
Figure 5:
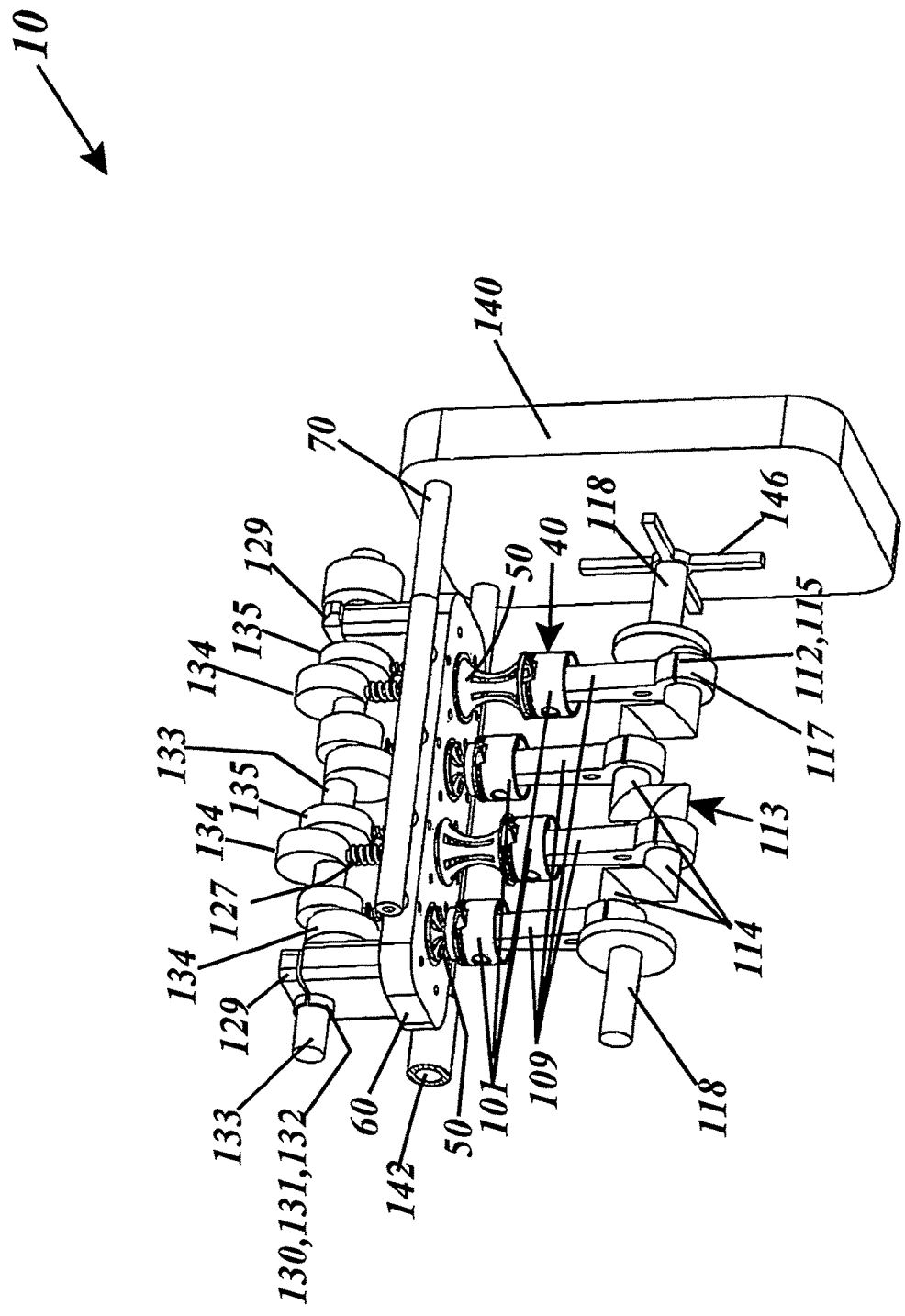
FIG. 5 is a schematic time diagram showing the relationship between the stroke of the piston assembly, the cam valves and the SMA spring.
Figure 6:
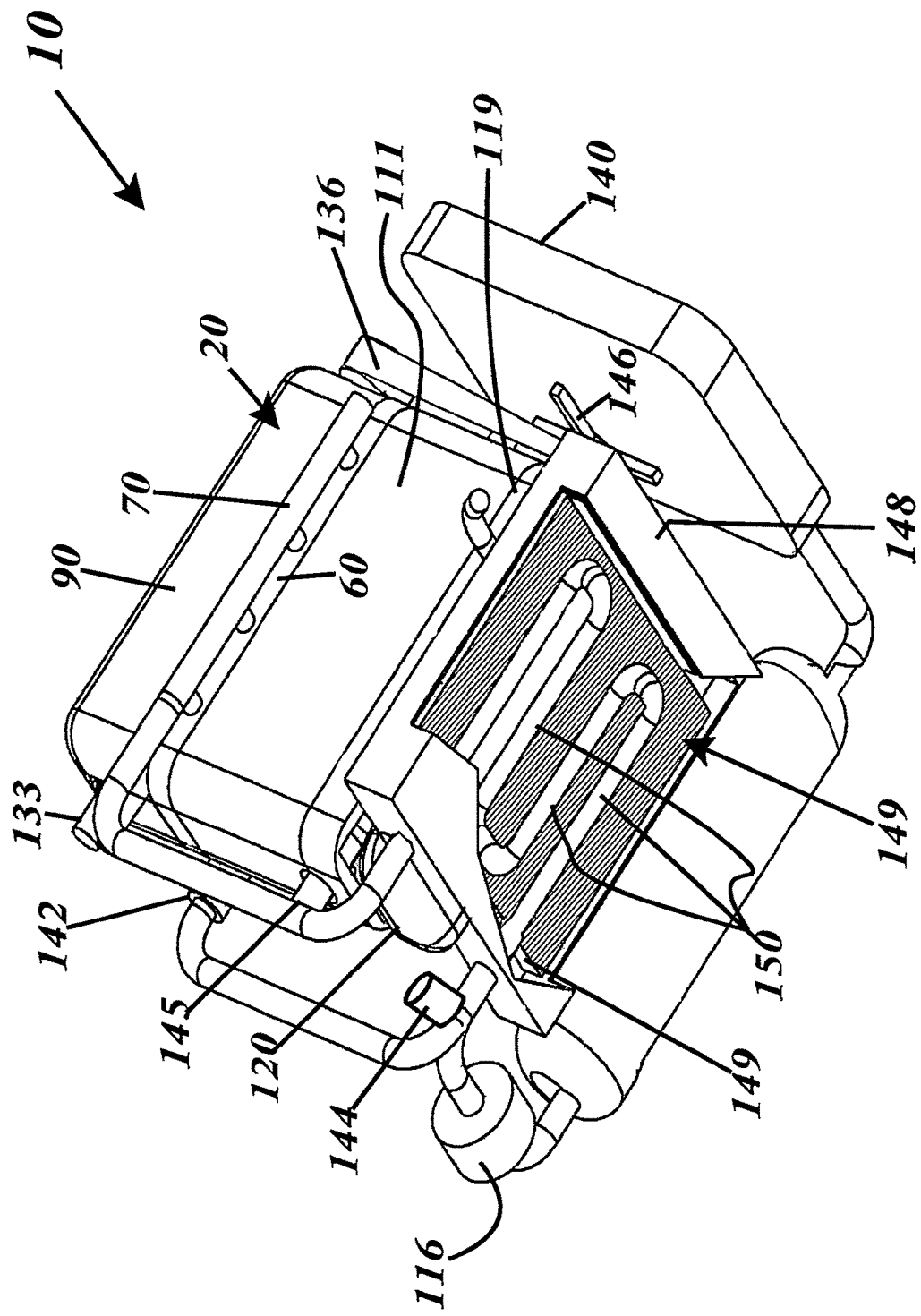
FIG. 6 is a diagram showing the relation of the valve block, and their relation to the intake valve, the exhaust valve, the intake manifold, the exhaust manifold, and the radiator and the fan; and the relation of the cam shaft, the cam lobes, the pistons, the crank rod, the crank shaft and drive shaft and the SMA springs.
Figure 7:
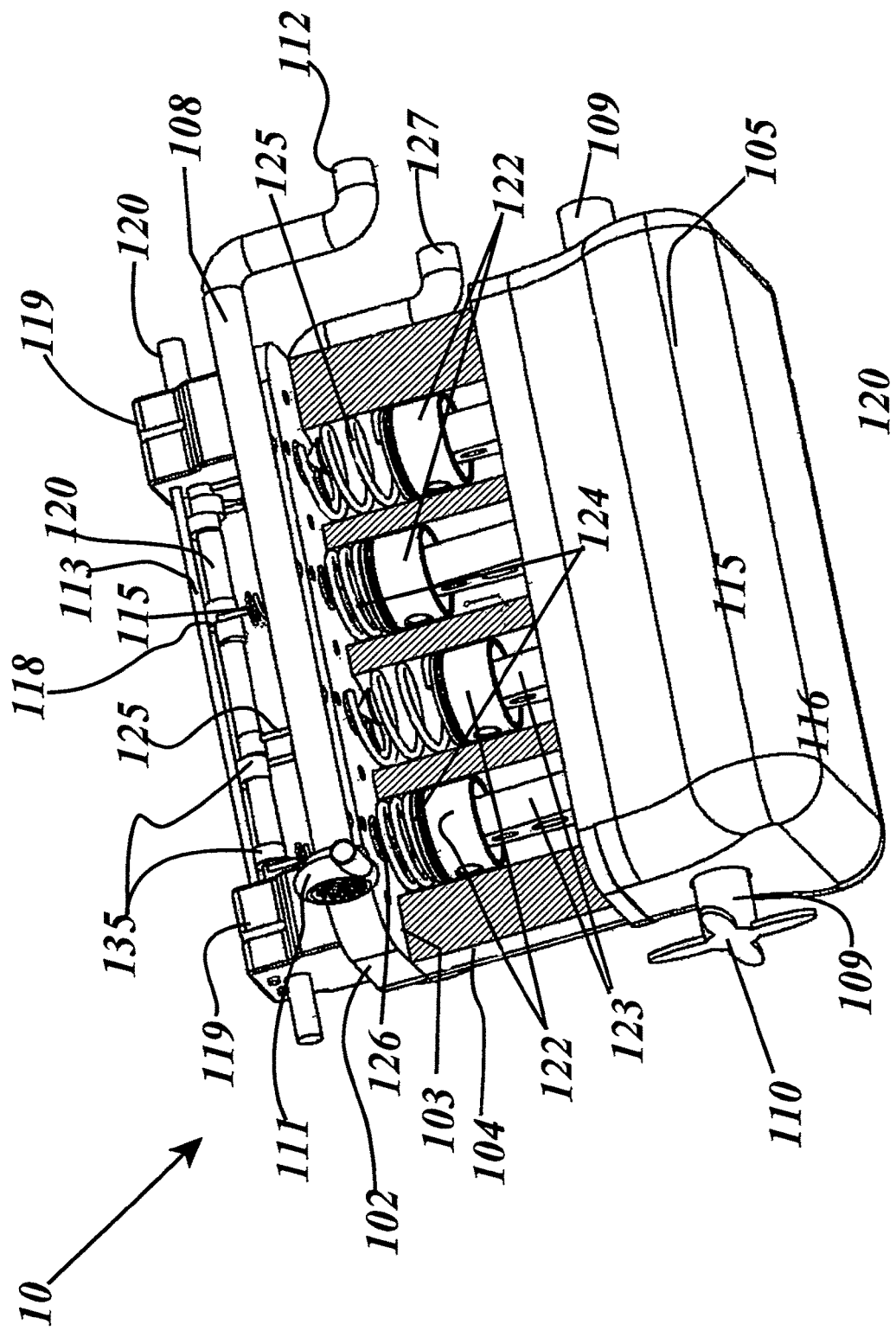
FIG. 7 shows a cut away view of the cylinder block of the apparatus according to all the embodiments with a coil spring for the SMA spring.
Figure 8:
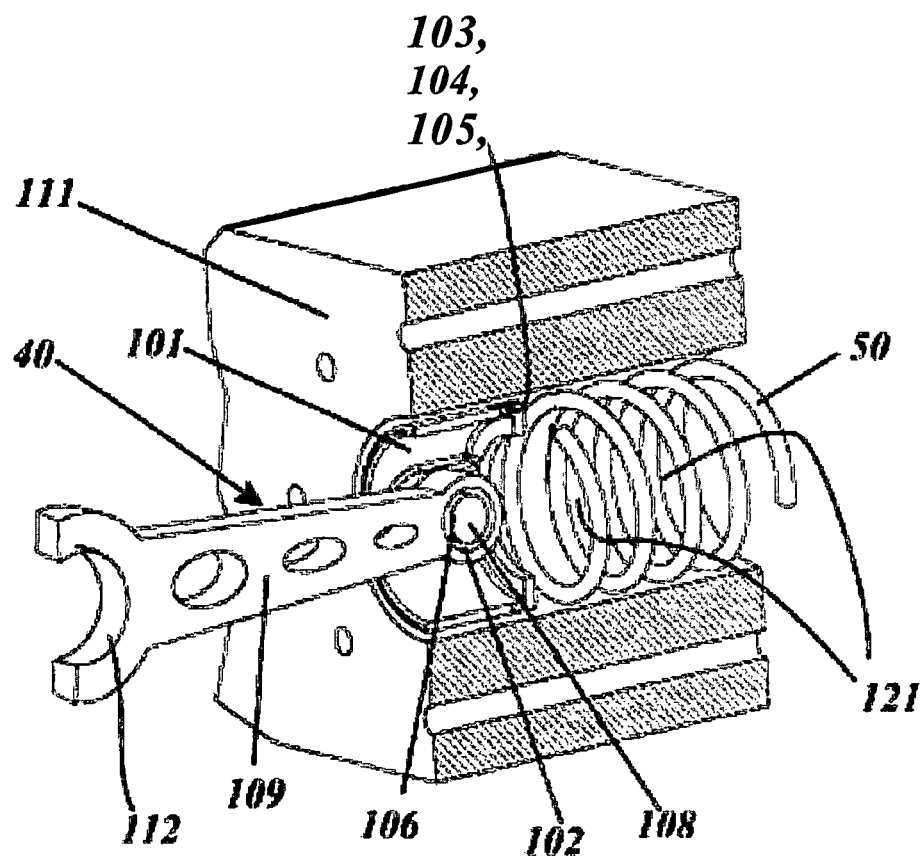
FIG. 8 shows a cut away view of the piston with a coil spring formation for the SMA spring according to the third embodiment.
Figure 9:
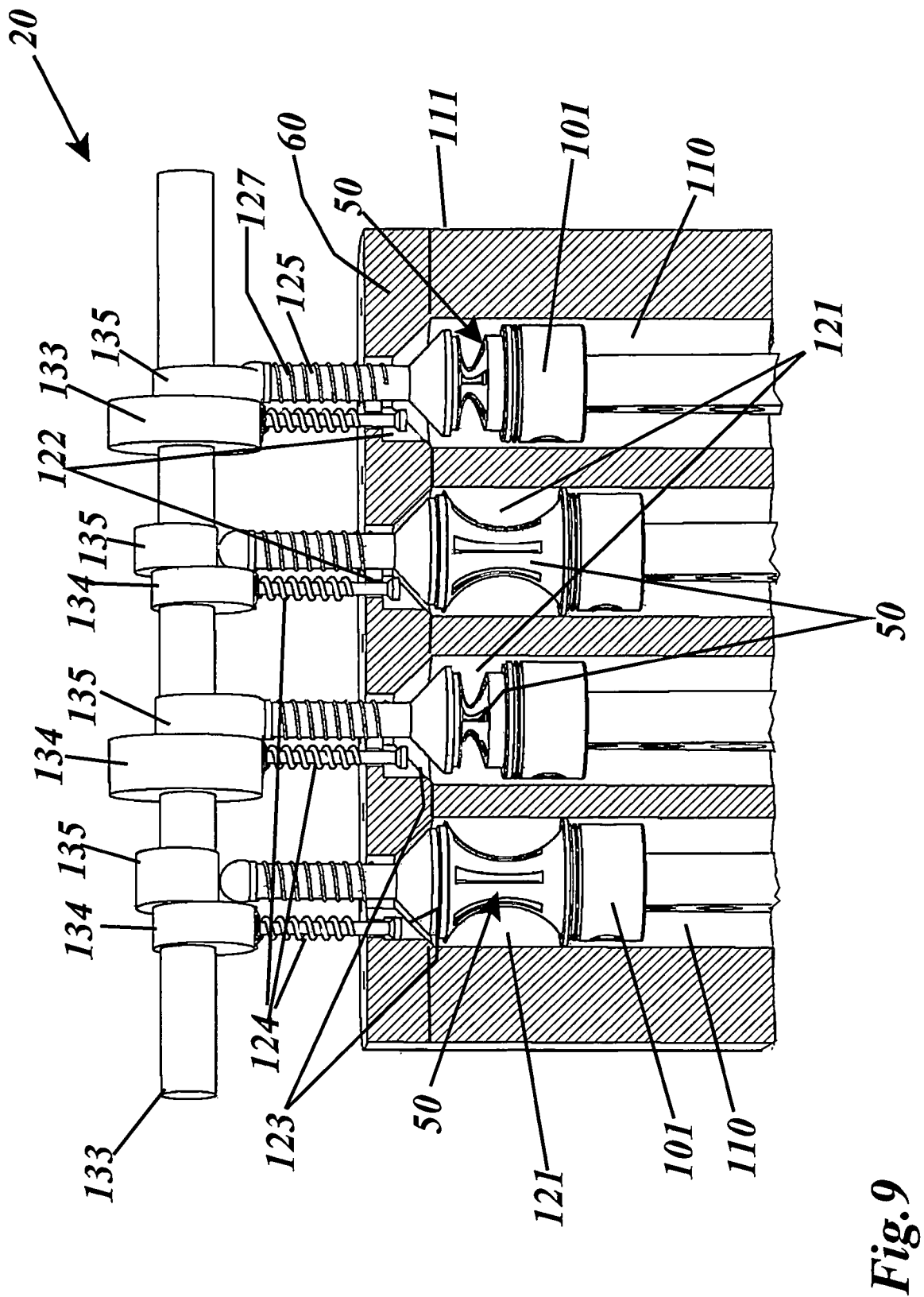
FIG. 9 shows a close up cut away view of the cylinder expansion chamber with details of the exhaust cam lobe, the exhaust valve, intake valve in a closed state and the intake cam lobe causing the intake valve to depress the extended SMA spring. The figure shows the SMA springs in compressed and extended states.
Figure 10:
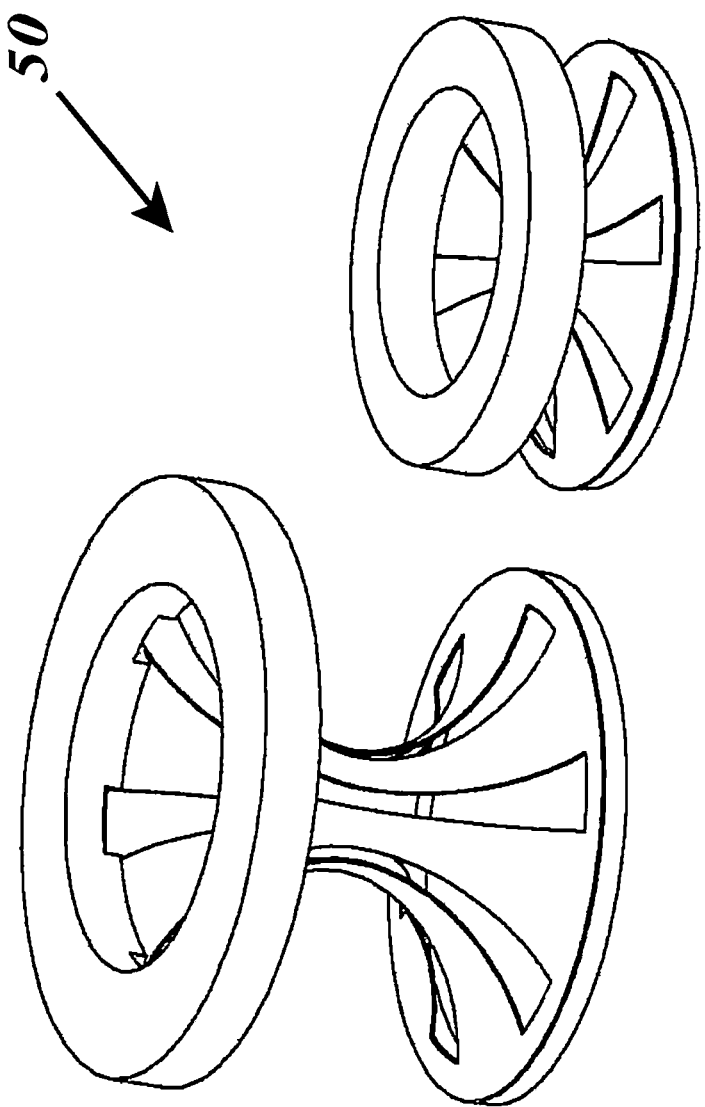
FIG. 10 shows one form of the SMA spring as a hyperboloid of rotation in an extended state and in a compressed state.
Figure 11:
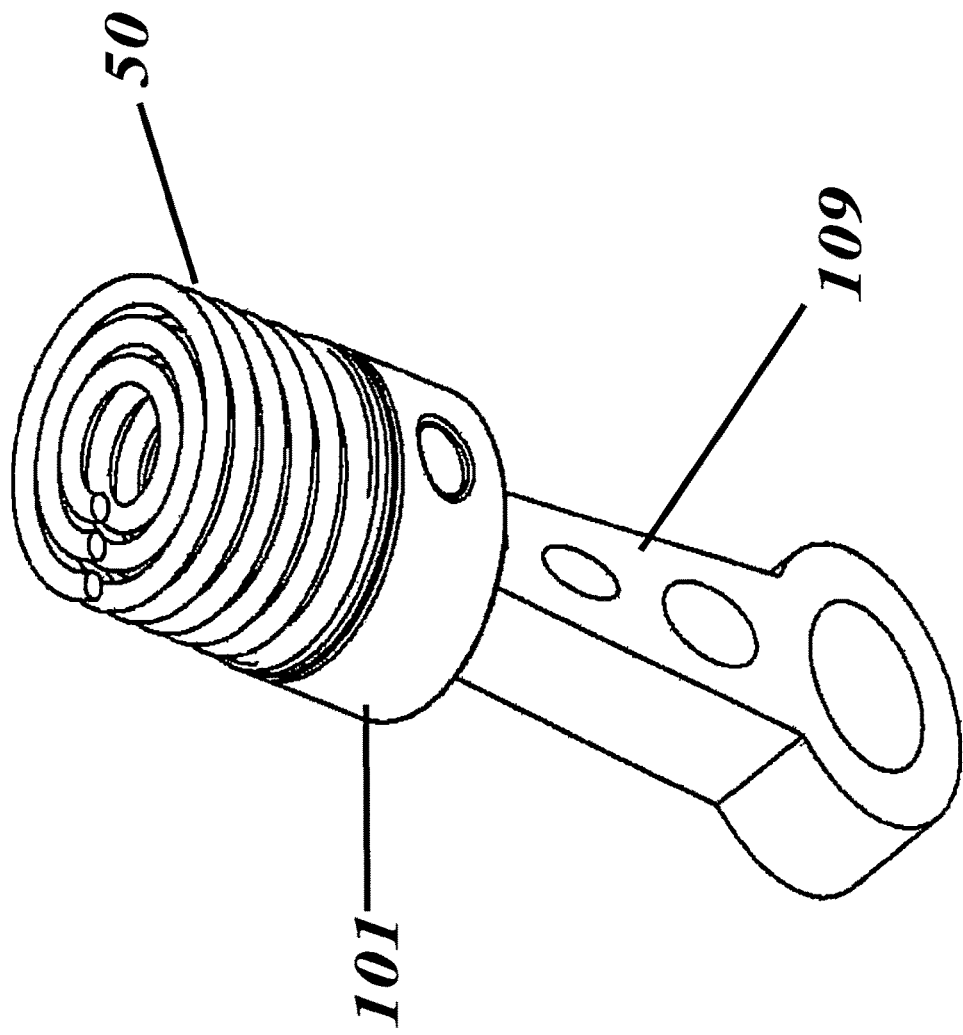
FIG. 11 shows a rendition of the piston with a multi-coil SMA spring.
Figure 12:
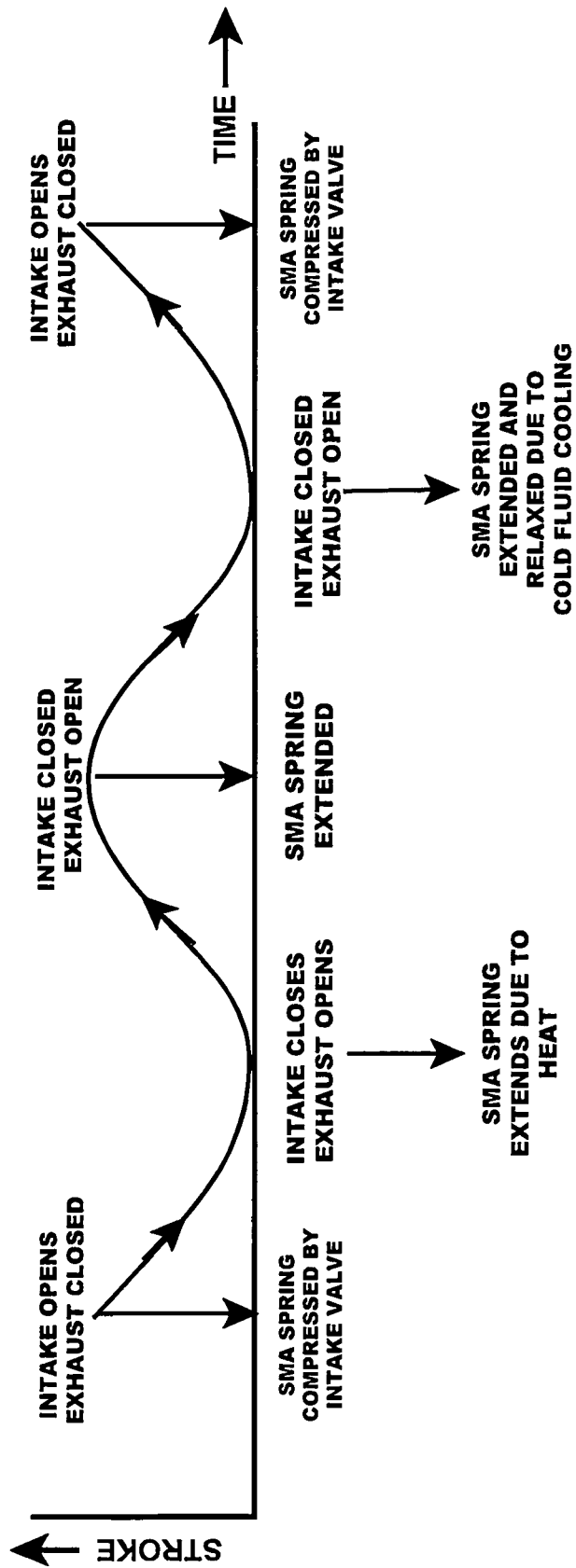
FIG. 12 is a schematic diagram of the states of the intake valve and the exhaust valves according to the second embodiment in relation to the states of the SMA spring.
Figure 13:
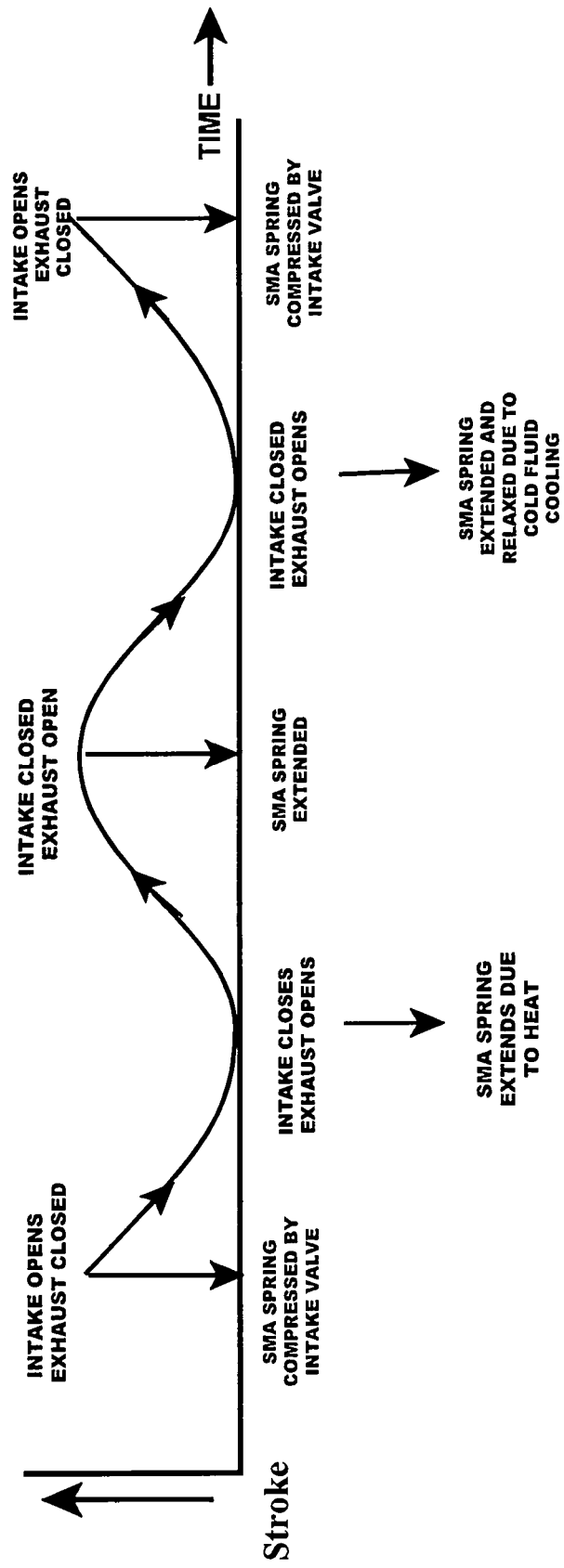
FIG. 13 is a schematic diagram of the states of the intake valve and the exhaust valves according to the third embodiment in relation to the states of the SMA spring.
Figure 14:
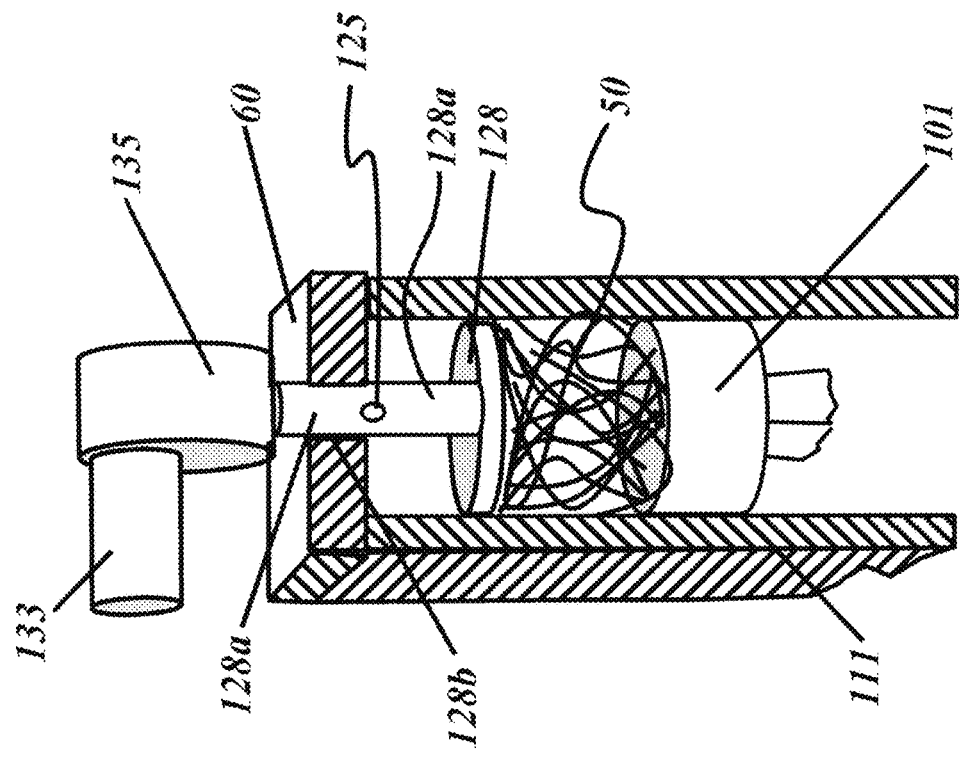
FIG. 14 shows an intake valve's action as it deforms the SMA spring in the form of many tiny straight wires into bent wires.
Figure 14:
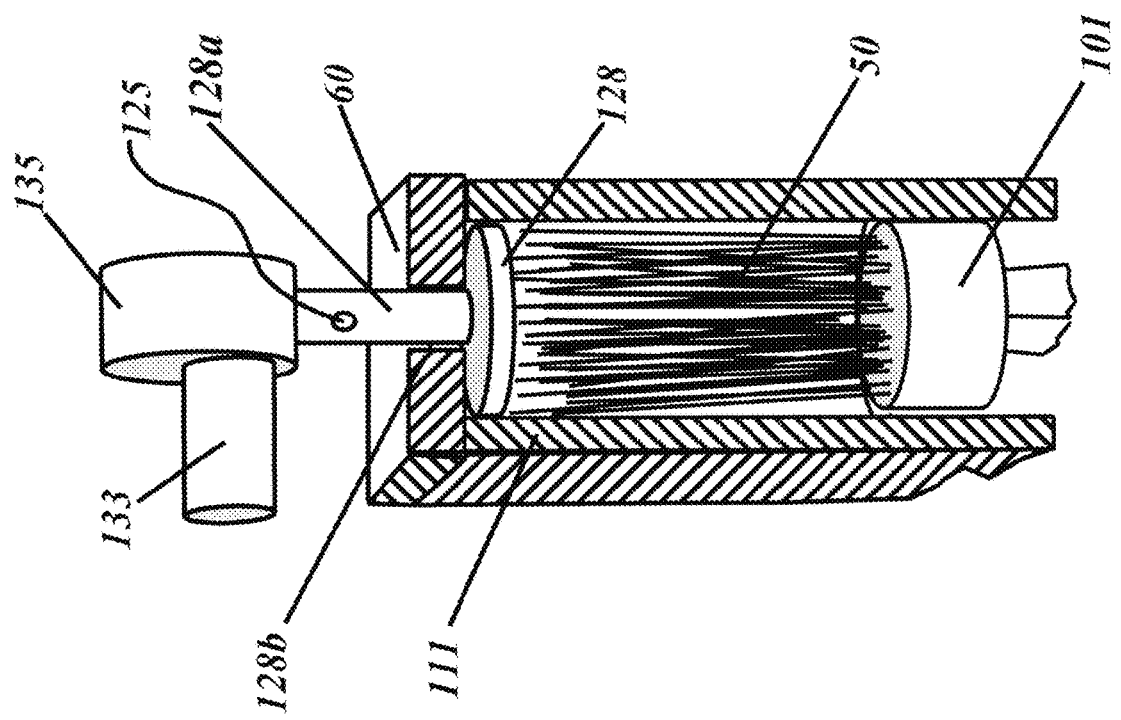
Figure 15:
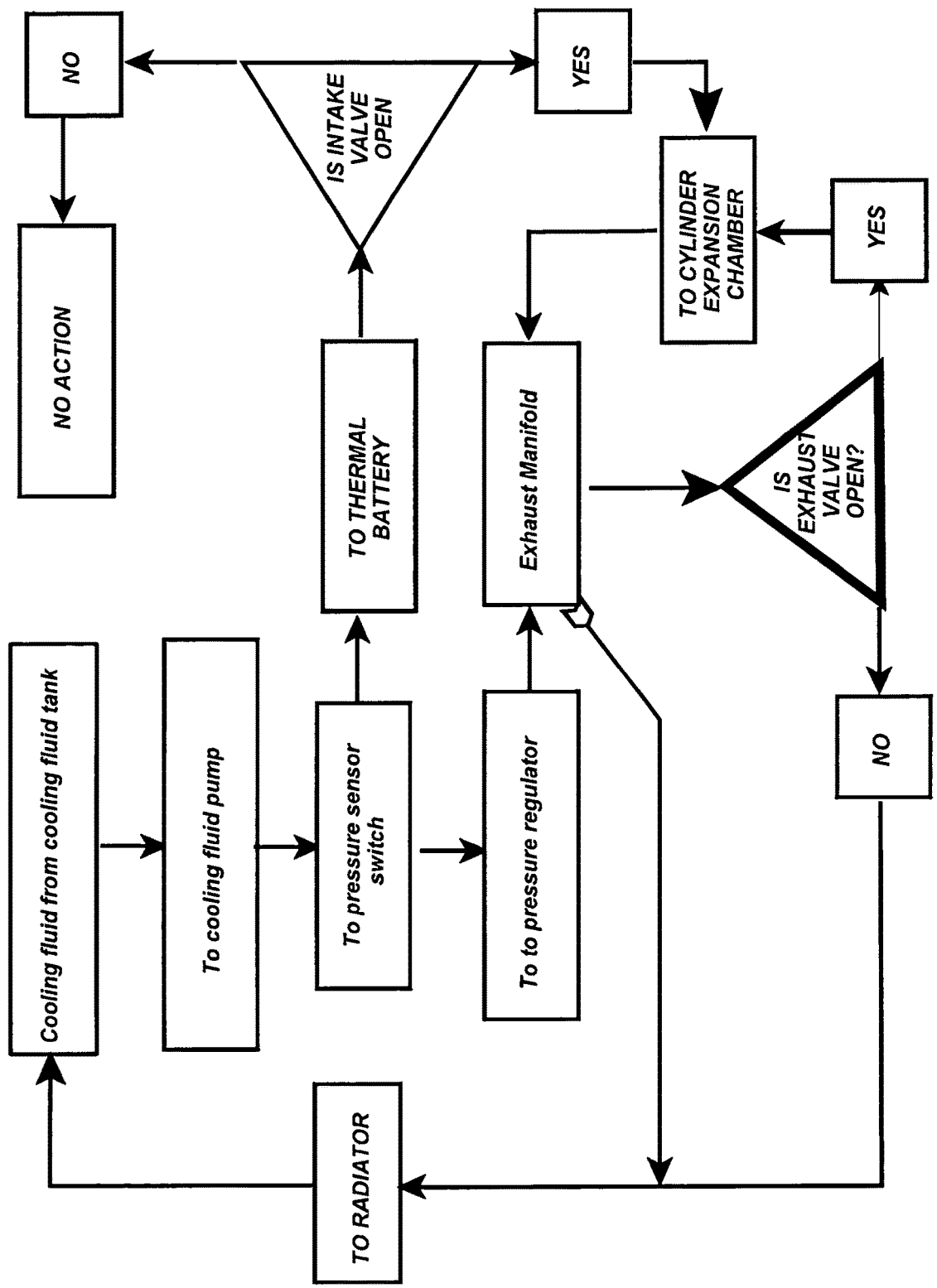
FIG. 15 is a schematic flow diagram of the closed system flow of cooling fluid and heating fluid as cooling fluid goes through the apparatus and the thermal battery.

Preferred Embodiments Referring to FIGS. 1-15, a solid state thermal engine 20 is disclosed. In its most basic form, as mentioned above generally, the thermal engine 20 incorporates several conventional engine elements including a valve block 60, valve cover 90, a cylinder block 111, crank case 119, and a sump 120. The cylinder block 111 has either one, or more cylinder expansion chambers 121 within each of which a piston head 101 is slidably and sealingly retained to form a variable volume cylinder expansion chamber 121 between the piston head 101 and the valve block 60. The valve block 60 has an intake valve 128 and exhaust valve 124, either of which can be controlled to permit the flow of intake heating fluid and of exhaust fluids respectively. The exhaust fluids can he both exhausted heating fluids and cooling fluids from the cylinder expansion chamber 121.

In the first and second embodiments of the invention, piston head 101 has seals 104 and wipers 105 provided as in a conventional engine to seat in piston groves 103 formed around the periphery of the piston head 101. In the third embodiment of the invention, piston head seals 104 arc not required, however piston head wipers 105 may be used to scat in piston groves 103 formed around the periphery of the piston head 101. The piston head seals 104 form a seal between the piston head 101 and the cylinder chamber hole 110.

For each of one of a single piston and a multiple piston configuration, the following method of assembly of the thermal engine 20 is used.

A cylindrical piston pivot pin bushing bearing 106 preferably made from oil impregnated brass material is inserted into the piston pivot pin hole 102 through the underside of each piston head 101. One end of a connecting rod 109 with a matching pivot connecting rod pin hole 108 is attached to the piston pivot pin hole 102 by a piston pivot pin 107 to form a piston assembly 40. The piston assembly 40 is inserted into evenly spaced cylinder chamber hole 110 that pass through the cylinder block 111. The other end of the connecting rod 109 has an open half round connecting rod bushing retainer 117 that has an open half round connecting rod bushing 115 as in a conventional engine. Crank shaft 113 has crank shaft offsets 114 that are clasped by two open half round connecting rod bushings 115. The crank shaft offsets 114 are locked rotatably in place with connecting rod bushing caps 129. The cylinder block 111 has a half round drive shaft 145 bearing support 117 to support the drive shaft 145 on half round drive shaft 145 hearings 115. A crank case 119 with a matching half round drive shaft 145 bearing 115 is also provided to lock the drive shaft 145 145 rotatably in place when bolted to the cylinder block 111. A sump 120 bolts to the open end of the crank case 119 to form a closed Thermal Engine Assembly 20.

When the piston head 101 is at top dead center, the open end of the cylinder chamber hole 110 forms a cylinder expansion chamber 121 inside of which an SMA spring 50 is placed to sit on each piston head 101. The inner face of the valve block 60 has an exhaust valve 124 seat and intake valve 128 seat that are open into cylinder expansion chamber 121.

An exhaust valve 124 has a cylindrical exhaust valve stem 124a that passes sealingly but slidingly through an exhaust stem hole 124b centrally located through the exhaust valve seat 124c. When the exhaust valve 124 sits on the exhaust valve seat 124c, it forms a fluid seal and the exhaust valve stem 124a projects through the exhaust stem hole 124b some height above the valve block 60. An exhaust valve spring 124e is provided and held in place around the exhaust valve stem 124a with an exhaust valve spring clip 124d at the top end of the exhaust valve 124 stem to hold exhaust valve spring 124e in place. The exhaust valve spring 124e holds the exhaust valve 124 with a compressive force against the outer face of the valve block 60 to properly seal as in a conventional engine.

An intake valve 128 has an intake valve stem 128a that passes sealingly but slidingly through the intake valve stem hole 128b centrally located through the intake valve seat 128c. When the intake valve 128 sits on the intake valve seat 128c, it forms a fluid seal and the intake valve stem 128a projects through the valve block 60 some height. An intake cross hole 125 on intake valve stem 128a allows heating fluid to enter into the cylinder expansion chamber 110 when the intake valve stem 128a is projected into cylinder expansion chamber 110 by the full compression stroke of SMA spring 50. An intake valve spring 128e is provided and held in place with an intake valve spring clip 128d at the top of the intake valve stem 128a to hold intake compression valve spring 128e. The intake valve stem 128a holds the intake valve spring 128e with a compressive force against the outer face of the valve block 60 to properly seat against the intake valve seat 128c as in a conventional engine.

Valve block 60 has two half round cam shaft 133 retainer with bearing seats 130 to accept a cam shaft 133 half-round bearing 131. A half round cam shaft 133 bearing cap 132 with a half round bearing 131 is used to lock the cam shaft 133 in place. The cam shaft 133 has an intake cam lobe 135 and an exhaust cam lobe 134 for each piston head 101 used. The intake cam lobe 135 activates the intake valve 128 and the exhaust cam lobe 134 activates the exhaust valve 124 periodically. The intake valve 128a stem is designed to be long enough to fully compress the SMA spring 50 from its extended state to its fully compressed state when the intake cam lobe 135 135 is activated and pushes it down. Intake valve 128 should also have a wide enough valve face to fully contact the SMA spring 50.

In all embodiments of the present invention, the exhaust valve 124 port fluidly connects to the exhaust manifold 80 for removing heating fluid and alternatively for receiving and exhausting cooling fluid into the cylinder expansion chamber 121. The action of the exhaust valve 124 is allowed to remove heating fluids from the cylinder expansion chamber 121 into a radiator 140 and alternately to allow cooling fluid from the cooling fluid tank 141 to flow through the exhaust manifold 80 through an exhaust manifold 80 check valve 142 to a radiator 140. Thus cooling fluid from the cooling fluid tank 141 flow into the exhaust manifold 80 can be tapped from the exhaust manifold 80 into the cylinder expansion chamber 121. The exhaust manifold 80 has an exhaust manifold 80 check valve 142 that only allows fluid flow to the radiator 140 and not back from the radiator 140

The intake manifold 70 connects fluidly to intake valve 128 to bring in heating fluid into the cylinder expansion chamber 121 to activate the SMA spring 50 to extend to its reformed extended Austenite state therein and to generate a force. The heating fluid can he expanded gaseous fluid or heating fluid generated from cooling fluid by the thermal battery 30. The intake manifold 70 fluidly connects through passages in the valve block 60 to as many intake valve as required for receiving heating fluid from a thermal battery 30. The heating fluid can be expanded gaseous fluid or heating fluid generated from cooling fluid that flowed through a thermal battery 30.

The exhaust valve 124 allows heating fluid to exit from the cylinder expansion chamber 121 into the exhaust manifold 80. However, it also allows cooling fluid to enter into and out of the exhaust manifold 80 from the cylinder expansion chamber 121 as desired by each embodiment. The exhaust manifold 80 fluidly connects through the valve block 60 to exhaust valves 124 for receiving cooling fluid from the cooling fluid pump 116 and alternatively to allow the flow of either cooling fluid or heating fluid from the cylinder expansion chamber 121 back to the exhaust manifold 80 then to flow back to the radiator 140.

The intake manifold 70 receives heating fluid from the thermal battery 30 to do thermodynamic work in the form of pressure expansion in the cylinder expansion chamber 121 when allowed by the intake valve 128 opening. This causes a thermal phase change extension of the SMA spring 50. Both processes involve phase changes. The heating fluid can be an expanded cooling fluid which has undergone a phase change from a liquid state to a gaseous stale in the thermal battery 30 and the SMA spring 50 can undergo a phase change and become extended from a relaxed deformed compressed Martensite state to a reformed extended Austenite state to generate a force on a piston head 101.

The exhaust valve 124 allows heating fluid and cooling fluid to exit from the cylinder expansion chamber 121 but also allows cooling fluid to enter into the cylinder expansion chamber 121 as desired by each embodiment.

The action of the exhaust valve 124 is to allow cooling fluids in and out of the cylinder expansion chamber 121 and also to allow both heating fluids and cooling fluids to exit from the cylinder expansion chamber 121 and flow into a radiator 140.

Cooling fluid from a cooling fluid tank 141 is pumped by cooling fluid pump 116 into the exhaust manifold 80. When the exhaust valve 124 is open, cooling fluid is pumped into the cylinder expansion chamber 121 unless there is already pressurized heating fluid within the cylinder expansion chamber 121 that must exit through the exhaust valve 124. Thus either cooling fluid, heating fluid, or a combination of both can flow from the cylinder expansion chamber 121 when the exhaust valve 124 is open. The exhaust manifold 80 has an exhaust manifold check valve 142 that allows fluid flow out of the cylinder expansion chamber 121 to go through the exhaust manifold 80 and flow to a radiator 140. The exhaust manifold check valve 142 does not allow flow back of fluids into the exhaust manifold 80 from the radiator 140. If exhaust valve 124 is closed, a continuous flow of cooling fluid is pumped by the cooling fluid pump 116 to pass from the cooling fluid tank 141 into the exhaust manifold 80 to enter through the exhaust manifold check valve 142 into the radiator 140. If the exhaust valve 124 is open, either heating fluid that has done work in the cylinder expansion chamber 121 will exit into the exhaust manifold 80 to the radiator 140, or cooling fluid will enter into the cylinder expansion chamber 121 from the exhaust manifold 80. This depends on whether a stroke is upward or downward.

An upward stroke minimizes the cylinder expansion chamber 121 volume and can exhaust either cooling fluid or heating fluid or a combination of both from the cylinder expansion chamber 121.

A downward stroke maximizes the cylinder expansion chamber 121 volume and can only pull cooling fluid into the cylinder expansion chamber 121. The flow of cooling fluid through the exhaust manifold 80 to the radiator 140 should be free from high back pressures so as not to introduce pressure on piston head 101 when a piston head 101 is on an upward stroke.

The thermal engine 20 further comprises a cooling fluid pump 116 that pumps cooling fluid to both the exhaust manifold check valve 142 and to a thermal battery 30. A teed output from the cooling fluid pump 116 allows flow to the thermal battery 30 and a separate flow to the exhaust manifold 80.

The thermal battery 30 consists of a contiguous thin walled thermal battery vacuum case 148 within which is sealingly contains a thermal mass 149. The thermal mass 149 has thermal battery passageways 150 within it for transferring stored thermal energy to the cooling fluid by means of the heated thermal mass 149. Thermal battery passageways 150 through thermal mass 149 are needed for uniform heating of the cooling fluid pump that circulates therein. The thermal mass 149 heats up the cooling fluid and if required expands the cooling fluid to a gaseous phase as an expanded heating fluid in the vapor form to transmit pressurized heating fluid into the intake manifold 70.

A pressure regulator 147 fluidly connects to one output of cooling fluid pump 116 that flows into the exhaust manifold 80 to generate a back pressure to ensure that the output of cooling fluid pump 116 is under adequate pressure to maintain a set pressure build up in the thermal battery 30. Thus the cooling fluid flowing to the thermal battery 30 has a set maximum pressure. An electric pressure sensor switches 144 senses the pressure of cooling fluid entering the thermal battery 30 and turns off the fluid pump 116 if the pressure is some measure above the set point of the pressure sensor switch 144. Thus the thermal battery 30 must always have a heating fluid pressure that is below the set point of the pressure sensor switch 144 but above the set point of the pressure regulator 147. Thus cooling fluid can flow through the pressure regulator 147 when the thermal battery 30's pressure is below the set point of the pressure sensor switch 144. Cooling fluid can flow into the exhaust manifold 80 when the cooling fluid pressure is above the set point of the pressure regulator 147 but below the set point of the pressure sensor switch 144. Otherwise the cooling fluid pump 116 shuts off. This way cooling fluid flows to both the pressure regulator 147 and through the thermal battery 30 until the pressure in the thermal battery 30 goes above the pressure setting of the pressure sensor switch 144 and the cooling fluid pump 116 shuts off.

If the pressure in the thermal battery 30 is below the set point of the pressure regulator 147, more cooling fluid flows to the thermal battery 30 to increase its pressure and the flow through the pressure regulator 147 into the exhaust manifold 80 is cut off to stop the cycle. In order for the flow of cooling fluid through the pressure regulator 147 to be maintained, the flow through the exhaust manifold 80 through the exhaust manifold 80 check valve 142 to the radiator 140 should be at a pressure below the pressure regulator 147 set point. This ensures that if any back up pressure from the radiator 140 greater than the set point of the pressure regulator 147 will be below the set point of the pressure sensor switch 144 as well.

Only cooling fluid flow that is above the pressure build up in thermal battery 30 and above the set point of the pressure regulator 147 but below the set point of the pressure sensor switch 144 goes into the exhaust manifold 80.

However, when the cooling fluid that has passed through pressure regulator 147 enters the exhaust manifold 80 its pressure is lower since it is freely flowing to either the radiator 140 or into the cylinder expansion chamber 121.

In all embodiments of the present invention, SMA spring 50 formed from shape memory alloys are provided to sit inside the cylinder expansion chamber 121 between the piston head 101 and the valve block 60 of the thermal engine 20. The SMA spring 50 are formed in the Austenite state as extended compressible springs. Thus when cooled they can be deformed to a compressed deformed Martensite state. Thus when heated they can be reformed into an extended Austenite state. A plurality of piston head 101 may be used with the invention. When the piston head 101 is at top dead center in the cylinder expansion chamber 121, the SMA spring 50 is designed with a specific diameter, height and shape to act as a compression spring and to sit snugly in the cylinder expansion chamber 121 but in the relaxed extended Martensite state at room temperature. The SMA spring 50 is designed to he in an Austenite state as fully extended compression springs. Thus when the piston head 101 is at top dead center, the SMA spring 50 has a minimal compression load to hold snugly against the valve block 60 and the piston head 101.

Air and other thermally conductive fluids such as water, engine oil, and steam may be used with the invention as heating fluid and cooling fluid. Thus the apparatus can use combinations of heating fluids and cooling fluids of different types.

With the following definition, the intake cam lobe 135 and the exhaust cam lobe 134 are designed to achieve the following sequence in a all embodiment of the invention. The crank shaft 118 position is at 0° Top dead center (TDC) when the piston is at TDC.

The intake valve 128 has an intake valve 128 stem that keep the flow of heating fluid closed off until it is fully extended into the cylinder expansion chamber 121. At rest it forms a tight seal with the intake valve 128 seat by means of the pressure of the valve spring. The intake valve 128 has an intake cross hole diametrically through the intake valve 128 stem, and positioned such that only when it is fully extended into the cylinder expansion chamber 121, the intake cross hole connects the intake manifold 70 to the cylinder expansion chamber 121. Thus the intake valve 128 does not allow heating fluid to enter into the cylinder expansion chamber 121 until it is fully extended. The fully extended position when the intake cross hole can feed heating fluid into the cylinder expansion chamber 121 is when the piston head 101 is at 0° TDC.

The intake valve 128 has a large contact area with the top of plane of the SMA spring 50 when the piston head 101 is at top dead center. The intake valve 128 cam lobe can cut Off and turn On the intake of heating fluid into the cylinder expansion chamber 121. However, when activated by the intake cam lobe 135 to do such, the intake valve 128 can project into the cylinder expansion chamber 121 to compress the SMA spring 50 when it is in a cool soft Martensite state.

When the piston head 101 is at top dead center, the cylinder expansion chamber 121 remains deep enough to accommodate the extended state of the SMA spring 50. The intake valve 128 can project into the cylinder expansion chamber 121 to compress the extended SMA spring 50 when desired to do so. However, when the intake valve 128 is closed and retracted, the total free height between the piston head 101 and the valve block 60 should be roughly but slightly less than the expanded length of the extended SMA spring 50 to keep it snug.

| First Preferred Embodiment | | | |
|---|---|---|---|
| PISTON POSITION RELATIVE TO CRANK SHAFT 118 ANGLE POSITION (positions are only examples) | SMA spring 50 state | Intake valve 128 state | Exhaust valve 124 state |
| 10° before TDC | Martensite deformation compression Phase | Intake valve 128 pushes SMA to compress it. No heating fluid flows. | Exhaust open to let out prior cycle cooling fluid. |
| 0° TDC | Austenite Reformation Extension phase | Intake valve 128 opens to let in heating fluid to heat SMA and extend it. | Exhaust closes. |
| 10° after TDC | Austenite Reformation Extension phase completed | Intake valve 128 fully retracted. No heating fluid flows. | Exhaust closed. |
| 180° after TDC | Austenite Reformation Extension phase | Intake closes. | Exhaust opens to let out heating fluid |
| 360° TDC | Martensite Reformation Extended phase | Intake closed | Exhaust closes to form a cooling vacuum. |
| 540° after TDC | Martensite Reformation Extended phase | Intake closed | Exhaust opens to let in cooling fluid. |
| 710° after TDC | Martensite deformation compression Phase | Intake valve 128 pushes SMA to compress it. No heating fluid flows | Exhaust open to let out prior cycle cooling fluid. |
| 0° TDC cycle repeats | Austenite Reformation Extension phase | Intake valve 128 opens to let in heating fluid to heat SMA and extend it. | Exhaust closes. |

In a first embodiment of the invention the heating fluid is preferably in vapor form having expanded from cooling fluid in the thermal battery 30 is under pressure. When an engine starting means turns the drive shaft 145, the cooling fluid pump 116 delivers a quantity of cooling fluid from the cooling fluid tank 141 and pumps it into the thermal battery 30 to receive heat from the thermal mass 149 causing the cooling fluid to become heating fluid. The heating fluid can be in vapor form but not necessarily. Some of the cooling fluid is bypassed through the pressure regulator 147 into the exhaust manifold 80 then flows through the exhaust manifold check valve 142 to the radiator 140. If the intake valve 128 is closed, this cooling fluid just circulates in continuous loop hack to the radiator 140 through the exhaust manifold 80 to be continuously cooled by the radiator 140 to act as cooling fluid.

In the start configuration, the SMA spring 50 is in an extended and relaxed Martensite at about 10° before TDC. The cam shaft 133 exhaust lobe keeps the exhaust valve 124 open to exhaust cooling fluid from the cylinder expansion chamber 121 from a previous cycle.

When the piston head 101 is at about 10° before TDC, the cam shaft 133 rotates and causes the intake cam lobe 135 to push the intake valve stem 128a and project it into the cylinder expansion chamber 121 to compress the SMA spring 50 against the rising piston head 101 while it is still soft in the Martensite state.

When the piston head 101 is at 0° top dead center, the exhaust valve 124 closes. The compressed SMA spring 50 is already compressed in a Martensite state and the heating fluid enters through the intake valve cross hole 125 and impinges upon the compressed SMA spring 50 to heat it from a cool compressed Martensitic phase to an extended Austenite state and allow it to extend against the piston head 101 and the valve block 60 and at the same time the heating fluid enters into the cylinder expansion chamber 121 and if in vapor phase expands and works in conjunction with the SMA spring 50 to push the piston head 101 in a first stroke toward bottom dead center to turn the drive shaft 145 and produce motion. The rotation of the drive shaft 145 during the first stroke causes the piston head 101 to fall toward bottom dead center.

When the piston head 101 is at about 10° after top dead center, the cam shaft 133 rotates and causes the intake cam lobe 135 to retract the intake valve 128 stem from the cylinder expansion chamber 121 and the heating fluid flow from the intake manifold 70 into the cylinder expansion chamber 121 through the intake cross hole is cut off. The exhaust valve 124 is still held closed.

At 180° from TDC, the piston head 101 starts to rise again in a second upward stroke toward TDC. The intake valve 128 is closed and the cam shaft 133 causes the exhaust cam lobe 134 134 to push and open the exhaust valve 124 to exhaust heating fluid from the cylinder expansion chamber 121. The hot exhausted heating fluid is transported through the exhaust manifold 80 that allows fluid flow only in one direction to a radiator 140. At the radiator 140 a fan 146 cools the heating fluid by passing ambient air through the radiator 140 fins. The heating fluid then cools and if a gas condenses to be pumped back by a condensate pump to the cooling fluid tank 141 as cooling fluid for reuse.

At 360° from top dead center the third downward stroke begins. The intake cam lobe 135 keeps the intake valve 128 closed and the cam shaft 133 causes the exhaust cam lobe 134 to close off the exhaust valve 124. Since there is nowhere for fluid to enter the cylinder expansion chamber 121 during the third downward stroke, a vacuum is formed and this cools the cylinder expansion chamber 121 to cool the SMA spring 50 into a Martensite state as an extended spring.

At 540° from top dead center the fourth and final upward stroke begins. The cam shaft 133 causes the intake cam lobe 135 to keep the intake valve 128 closed and the exhaust cam lobe 134 to open the exhaust valve 124. The vacuum that was formed in the prior third downward stroke exists in the cylinder expansion chamber 121 and is now relieved by cooling fluid entering through into the expansion cylinder chamber through the exhaust manifold 80. This allows cooling fluid from the cooling fluid tank 141 to flow into the cylinder expansion chamber 121 as it minimizes to TDC to further cool the SMA spring 50 into the extended Martensite state.

At 710° from top dead center the cycle begins again and the cam shaft 133 causes the intake cam lobe 135 to push open the intake valve 128 and project it into the cylinder expansion chamber 121 to compress the expanded SMA spring 50 against the rising piston head 101. The cycle is repeated until it is stopped by simply closing of the supply of expanded fluid to the intake valve 128.

Second Preferred Embodiment

In a second embodiment of the invention the heating fluid is preferably in vapor form having expanded from cooling fluid in the thermal battery 30 under pressure. When an engine starting means turns the drive shaft 145, the cooling fluid pump 116 delivers a quantity of cooling fluid from the cooling fluid tank 141 and pumps it into the thermal battery 30 to receive heat from the thermal mass 149 causing the cooling fluid to become heating fluid. The heating fluid can be in vapor form but not necessarily. Some of the cooling fluid is bypassed through the pressure regulator 147 into the exhaust manifold 80 then flows through the exhaust manifold 80 check valve 142 to the radiator 140. If the intake valve 128 is closed, this cooling fluid just circulates continuous loop back to the radiator 140 through the exhaust manifold 80 to be continuously cooled by the radiator 140 to act as cooling fluid.

| PISTON POSITION RELATIVE TO CRANK SHAFT 118 ANGLE POSITION (positions are only examples) | SMA spring 50 state | Intake valve 128 state | Exhaust valve 124 state |
| --- | --- | --- | --- |
| 10° before TDC | Martensite deformation compression Phase | Intake valve 128 pushes SMA to compress it. No heating fluid flows. | Exhaust open to let out prior cycle cooling fluid. |
| 0° TDC | Austenite Reformation Extension phase | Intake valve 128 opens to let in heating fluid to heat SMA and extend it. | Exhaust closes. |
| 10° after TDC | Austenite Reformation Extension phase completed | Intake valve 128 fully retracted. No heating fluid flows. | Exhaust closed. |
| 180° after TDC | Austenite Reformation Extension phase | Intake closes. | Exhaust opens to let out heating fluid |
| 360° TDC | Martensite Reformation Extended phase | Intake closed | Exhaust opens to draw in more cooling fluid. |
| 540° after TDC | Martensite Reformation Extended phase | Intake closed | Exhaust opens to let out cooling fluid. |
| 710° after TDC | Martensite deformation compression Phase | Intake valve 128 pushes SMA to compress it. No heating fluid flows | Exhaust is still open to let out prior cycle cooling fluid. |
| 0° TDC cycle repeats | Austenite Reformation Extension phase | Intake valve 128 opens to let in heating fluid to heat SMA and extend it. | Exhaust closes. |

In the start configuration, the SMA spring 50 is in an extended and relaxed Martensite at 10° before TDC. The cam shaft 133 exhaust lobe keeps the exhaust valve 124 open to exhaust cooling fluid from the cylinder expansion chamber 121 from a previous cycle.

When the piston head 101 is at about 10° before TDC, the cam shaft 133 rotates and causes the intake cam lobe 135 to push the intake valve 128 stem and project it into the cylinder expansion chamber 121 to compress the SMA spring 50 while it is still soft in the Martensite state against the rising piston head 101.

When the piston head 101 is at 0° top dead center, the exhaust valve 124 closes. The compressed SMA spring 50 is already compressed in a Martensite state and the heating fluid enters through the intake valve 128 cross hole and impinges upon the compressed SMA spring 50 to heat it from a cool compressed Martensitic phase to an extended Austenite state and allow it to extend against the piston head 101 and the valve block 60 and at the same time the heating fluid enters into the cylinder expansion chamber 121 and if in vapor phase expands and works in conjunction with the SMA spring 50 to push the piston head 101 in a first stroke toward bottom dead center to turn the crankshaft and produce motion. The rotation of the crankshaft during the first stroke causes the piston head 101 to fall toward bottom dead center.

When the piston head 101 is at about 10° after TDC, the cam shaft 133 rotates and causes the intake cam lobe 135 to retract the intake valve 128 stem from the cylinder expansion chamber 121 and the heating fluid flow from the intake manifold 70 into the cylinder expansion chamber 121 through the intake cross hole is cut off. The exhaust valve 124 is still held closed.

At 180° from TDC, the piston head 101 starts to rise again in a second upward stroke toward top dead center. The intake valve 128 is closed and the cam shaft 133 causes the exhaust cam lobe 134 to push and open the exhaust valve 124 to exhaust heating fluid from the cylinder expansion chamber 121. The hot exhausted expanded fluid is transported through the exhaust manifold 80 that allows fluid flow only in one direction to a radiator 140. At the radiator 140 a fan 146 cools the heating fluid by passing ambient air through the fins of radiator 140. The heating fluid then cools and if a gas condenses to be pumped back by a cooling fluid pump 116 to the cooling fluid tank 141 as cooling fluid for reuse.

At 360° from TDC, the third downward stroke begins. The intake cam lobe 135 keeps the intake valve 128 closed and the cam shaft 133 causes the exhaust cam lobe 134 to keep open the exhaust valve 124. Since the exhaust valve 124 is open, the free flow of cooling fluid enters the cylinder expansion chamber 121 during the third downward stroke and is pulled in by the piston head 101. This cools the cylinder expansion chamber 121 to cool the SMA spring 50 into an extended Martensite state as an extended spring.

At 540° from top dead center the fourth and final upward stroke begins. The cam shaft 133 causes the intake cam lobe 135 to keep the intake valve 128 closed and the exhaust cam lobe 134 to keep open the exhaust valve 124. The cooling fluid from the cylinder expansion chamber 121 and is now relieved by entering into the exhaust manifold 80.

At 710° from top dead center the cycle begins again and the cam shaft 133 causes the intake cam lobe 135 to push open the intake valve 128 and project it into the cylinder expansion chamber 121 to compress the expanded SMA spring 50 against the rising piston head 101. The cycle is repeated until it is stopped by simply closing of the supply of expanded fluid to the intake valve 128.

Third Preferred Embodiment

In a third embodiment of the invention the heating fluid is preferably in liquid form having being heated from cooling fluid in the thermal battery 30. When an engine starting means turns the drive shaft 145, the cooling fluid pump 116 delivers a quantity of cooling fluid from the cooling fluid tank 141 and pumps it into the thermal battery 30 to receive heat from the thermal mass 149 causing the cooling fluid to become heating fluid. Some of the cooling fluid from the cooling fluid tank 141 is bypassed through the pressure regulator 147 into the exhaust manifold 80 then flows through the exhaust manifold check valve 142 to the radiator 140. If the intake valve 128 is closed, this cooling fluid just circulates continuous loop back to the radiator 140 through the exhaust manifold 80 to be continuously cooled by the radiator 140 to act as cooling fluid.

In this embodiment, fluids can freely pass through the piston head 101 and fall into the sump 120 with little hindrance. The piston head 101 has large openings to let through fluids.

| PISTON POSITION RELATIVE TO CRANK SHAFT 118 ANGLE POSITION (positions are only examples) | SMA spring 50 state | Intake valve 128 state | Exhaust valve 124 state |
| --- | --- | --- | --- |
| 10° before TDC | Martensite deformation compression Phase | Intake valve 128 pushes SMA to compress it. No heating fluid flows. | Exhaust open to let in cooling fluid. |
| 0° TDC | Austenite Reformation Extension phase | Intake valve 128 opens to let in heating fluid to heat SMA and extend it. | Exhaust closes. |
| 10° after TDC | Austenite Reformation Extension phase completed | Intake valve 128 fully retracted. No heating fluid flows. | Exhaust closed. |
| 180° after TDC | Austenite Reformation Extension phase | Intake closes. | Exhaust opens to let out cooling fluid |
| 360° TDC | Martensite Reformation Extended phase | Intake closed | Exhaust open to let in cooling fluid.. |
| 540° after TDC | Martensite Reformation Extended phase | Intake closed | Exhaust open to let in cooling fluid. |
| 710° after TDC | Martensite deformation compression Phase | Intake valve 128 pushes SMA to compress it. No heating fluid flows | Exhaust open to let in cooling fluid.. |
| 0° TDC cycle repeats | Austenite Reformation Extension phase | Intake valve 128 opens to let in heating fluid to heat SMA and extend it. | Exhaust closes. |

In the start configuration, the SMA spring 50 is in an extended and relaxed Martensite at 10° before TDC. The cam shaft exhaust lobe 134 keeps the exhaust valve 124 open to let in cooling fluid from the exhaust manifold 80 into the cylinder expansion chamber 121 to cool the SMA spring 50.

When the piston head 101 is at about 10° before TDC, the cam shaft 133 rotates and causes the intake cam lobe 135 to push the intake valve 128 stem and project it into the cylinder expansion chamber 121 to compress the SMA spring 50 while it is still soft in the Martensite state against the rising piston head 101.

When the piston head 101 is at 0° top dead center, the exhaust valve 124 closes. The compressed SMA spring 50 is already compressed in a Martensite state and the heating fluid enters through the intake valve cross hole 125 and impinges upon the compressed SMA spring 50 to heat it from a cool compressed Martensitic phase to an extended Austenite state and allow it to extend against the piston head 101 to push the piston head 101 in a first stroke toward bottom dead center to turn the crankshaft and produce motion. The rotation of the drive shaft 145 during the first stroke causes the piston head 101 to fall toward bottom dead center. Heating fluid simply falls into the sump 120. Sump 120 can act as the cooling fluid tank 141 if fluidly connected to radiator 140. Since the cooling fluid pump 116 can still pull cooling fluid from the radiator 140 and thus from sump 120, the collected fluids in sump 120 can be sucked into the radiator 140 by a negative pressure or by simple gravitational flow.

When the piston head 101 is at about 10° after TDC, the cam shaft 133 rotates and causes the intake cam lobe 135 to retract the intake valve stem 128*a* from the cylinder expansion chamber 121 and the heating fluid flow from the intake manifold 70 into the cylinder expansion chamber 121 through the intake cross hole 125 is cut off. The exhaust valve 124 is still held closed.

At 180° from TDC, the piston head 101 starts to rise again in a second upward stroke toward top dead center. The intake valve 128 is closed and the cam shaft 133 causes the exhaust cam lobe 134 to push and open the exhaust valve 124 to allow cooling fluid to enter into the cylinder expansion chamber 121. The cooling fluid flows through the exhaust manifold 80 into the cylinder expansion chamber 121 to fall to the sump 120 where it is collected to be pumped back to radiator 140 if not cooling fluid is used. Otherwise it is pulled from the radiator 140 which pulls from sump 120 and then pumped back to cooling fluid tank 141.

At 360° from TDC the third downward stroke begins. The intake cam lobe 135 keeps the intake valve 128 closed and the cam shaft 133 causes the exhaust cam lobe 134 to keep open the exhaust valve 124. Since the exhaust valve 124 is open, cooling fluid enters the cylinder expansion chamber 121 during the third downward stroke and cools the cylinder expansion chamber 121 to cool the SMA spring 50 into an extended Martensite state as an extended spring.

At 540° from the fourth and final upward stroke begins. The cam shaft 133 causes the intake cam lobe 135 to keep the intake valve 128 closed and the exhaust cam lobe 134 to keep open the exhaust valve 124. The cooling fluid still flows into the cylinder expansion chamber 121 through the piston head 101 and into the sump 120.

At 710° from TDC the cycle begins again and the cam shaft 133 causes the intake cam lobe 135 to push open the intake valve 128 and project it into the cylinder expansion chamber 121 to compress the expanded SMA spring 50 against the rising piston head 101. The cycle is repeated until it is stopped by simply closing of the supply of expanded fluid to the intake valve 128.

The sump 120 will have a mixture of cooling fluid and heating fluid and thus will generally need to be cooled again by a radiator 140 to bring it to below the transition temperature of the SMA spring 50. Advantageously in the third embodiment, the cooling fluid may be a suitable oil, water, a 50% to 50% mixture of water and ethylene glycol. Such a fluid must have good thermodynamic thermal storage capacity and act as both a good heat source for the activation of the SMA spring 50 and for cooling the same. Further, the thermal engine 20 may be cooled by the cooling fluid without need for cooling passages through it. Advantageously a lubricating oil may also be added to the cooling fluid for the third embodiment.

Fourth Preferred Embodiment

The invention is not limited to a four-stroke cycle. It be configured as a two-stroke engine if air is used as a working fluid.

In the two-stroke configuration when the piston head 101 is at about 45° before TDC, the cam shaft 133 rotates and causes the intake cam lobe 135 to push the intake valve 128 stem and project it into the cylinder expansion chamber 121. The cam shaft 133 causes the exhaust cam lobe 134 to open the exhaust valve 124 and let out some air as cooling fluid.

At about 15° before TDC, the cam shaft 133 rotates and causes the intake cam lobe 135 to push the intake valve 128 to close and causes the exhaust cam lobe 134 to close the exhaust valve 124. Since both valves are closed the rising piston head 101 compresses the air in the chamber at 0° TDC and causes it to become heating fluid.

The SMA spring 50 while it is still soft in the Martensite state against the rising piston head 101. When the piston head 101 is at 0° top dead center, the compressed SMA spring 50 is already in a Martensite state and the air within the cylinder expansion chamber is compressed to generate heat and becomes heating fluid. Heating fluid impinges upon the compressed SMA spring 50 to heat it from a cool compressed Martensitic phase to an extended Austenite state and allow it to extend against the piston head 101 to push the piston head 101 in a first stroke toward bottom dead center to turn the crankshaft and produce motion.

The rotation of the drive shaft 145 during the first downward stroke causes the piston head 101 to fall toward bottom dead center. As it falls back to 180° after TDC, it forms a vacuum and cools extended Austenite state of the SMA spring to an extended Martensitic phase. The cycle is then repeated on the second stroke at 215° after TDC where again the cam shaft 133 rotates and causes the intake cam lobe 135 to push the intake valve 128 stem and project it into the cylinder expansion chamber 121. The cam shaft 133 causes the exhaust cam lobe 134 to open the exhaust valve 124 and let out some air as cooling fluid.

And again, at about 315° after TDC, the cam shaft 133 rotates and causes the intake cam lobe 135 to push the intake valve 128 to close and causes the exhaust cam lobe 134 to close the exhaust valve 124. Since both valves are closed the rising piston head 101 compresses the air in the chamber at 0° TDC and causes it to become heating fluid.

Additional Embodiments

The SMA spring 50 has several possible embodiments that are obvious. For example, a multitude of thin wire compression springs could be formed in a concentric axial alignment to perform the same function. Further, as shown in FIGS. 8, 10, 11, and 14. A leaf spring configuration with multiple leaves arranged in a hyperboloid profile could be used. The compression force ratio between the Austenite state and the Martensite state is about 4-1. Thus the SMA spring 50 wire should have adequate thickness to generate a substantial force.

Further if advantageously the hot cooling fluid used in the third embodiment is cooled by the radiator 140 and reused, the wasted heat from a plant can he used to run the thermal engine 20. Further, the third embodiment can he used as a separate power source using exhaust waste heat to power a generator or other devices in a conventional vehicle. For example, if the wasted exhaust heat from a combustion engine is used to heat the hot cooling fluid, then the cooled coolant can be used as the cooling fluid.

Both contraction and relaxation of the SMA spring 50 are virtually instantaneous with the temperature of wire it is made from. As a result, actual cycle speed of the process of expansion and contraction depends on temperature changes of the wire.

The piston head 101 motion generates a force transmitted by the piston connecting rod 109 connector to turn the crankshaft and generate mechanical power using the thermodynamic potential of a phase change in a metal as demonstrated in the third embodiment. In the first and the second embodiments, heating fluid exits through exhaust valve 124 into the exhaust manifold 80 for removal into a radiator 140 where it is cooled and the sump 120 may contain lubricating oils as usual.

Other valve operating means such as electronic solenoid valves actuation means may be used to perform the same function as the cam shaft 133.

In general operation of the apparatus, heat is generated and stored in the thermal mass 149 by one of several means. The first preferred means is by passing electric current through resistive heating elements embedded in the thermal mass 149 for a period of time and the second alternative means is by imposing radiation heater elements such as from infrared heating elements embedded in the thermal mass 149, and the third preferred means is by using electromagnetic induction heating means on the thermal mass 149 for a period of time, and the fourth preferred means for special approved applications is by using a radiative element such as thorium to continuously heat the thermal mass 149.

The present invention accomplishes the above-stated objectives, as well as others, as may be determined by a fair reading and interpretation of the entire specification.

The present invention relates generally to the field of engines that convert heat into mechanical energy. More specifically the present invention relates to a thermal engine 20 such as for powering a vehicle, a train or other devices, including a cylinder and a piston having a piston head 101 and a piston crank and an insulated thermal battery 30 including at least a thermal mass 149 such as a metal block for storing and retaining heat to cause heating fluid to expand inside a cylinder expansion chamber 121 between the cylinder head and the piston head 101 to drive a crankshaft.

Since the anticipated operating temperature of the thermal cooling fluid depends on it boiling point, except for the thermal battery 30, the remaining thermal engine 20 can be constructed from durable materials such as aluminum and a suitable plastic material such as polypropylene or peek. In its most basic form, as mentioned above generally, the thermal engine 20 incorporates several conventional engine elements including valve cover sealingly mated to a valve block 60 sealingly mated to an engine block with a crank case 119 that is sealingly mated to a sump 120. These components of the thermal engine 20 could be injection molded from suitable plastics and then lined with stainless steel inserts in areas where wear might be a problem.

The engine block has one or more longitudinal spaced cylinder chambers bored through it with axes perpendicular to its open face within each of which a piston head 101 is slidably and sealingly retained to form a variable volume cylinder expansion chamber 121 between the piston head 101 and the valve block 60. The other end of the engine block is sealingly connected to thin walled crankcase. The anticipated operating temperature of the engine block, the valve cover, the valve block 60, the crankcase, the sump 120 and the piston head 101 is below the melt point of most plastics and so these components could be constructed from durable materials such as aluminum allows, plastics such as Peek, Vespel® SP-1 Polyimide, Meldin® 7001 Polyimide, Kapton® Polyimide, Kaptrex® Polyimide, Torlon® 4203, Vestakeep® PEEK, Cerama-PEEK®, Ryton®-PPS-40% glass-Filled and Celazole® PBI. Celazole® PBI offers the highest heat resistance and mechanical property retention over 400° F. well above the boiling point of water. The cylinder chamber could be lined with stainless steel sleeves to prevent wear due to the sliding motion of the piston head 101.

The thermal battery vacuum case 148 surrounds the thermal mass 149 so that a vacuum is pulled in the thermal battery vacuum case 148 to surround the thermal mass 149 and insulate it from convective heat loss. Thermal battery vacuum case 148 should have highly reflective inside walls to prevent radiation losses from the thermal mass 149. Sealed thermal battery passageways 150 fluidly connect the thermal mass 149 to the cooling fluid pump 116 to circulate cooling fluid within and through the thermal mass 149 for uniform heating.

The thermal battery vacuum case 148 and thermal mass 149 must be constructed from durable high melting point materials such as stainless steel, titanium or ceramics. The thermal battery vacuum case 148 must be made from heat resistant and low expansion materials such as ceramics and metal allows. They cannot be made from plastic or aluminum since it must withstand very high temperatures.

A flywheel may be attached to the drive shaft 145 connected to one end of the crankshaft preferably extends out of the crankcase through a shaft port to transmit the thermal engine 20 power in the form of torque to any desired mechanical load such as the cooling fluid pump 116, and a generator for recharging a battery.

The thermal engine 20 is started by the engine starter switch. Thus sends power to an electric engine starter and causes it to rotate the drive shaft 145 connected to turn crank shaft 113. It is preferable that an electric cooling fluid pump 116 be used so that it can be started and turned off by an engine starter switch. If the cooling fluid pump 116 is driven by the engine crank shaft 145 then. since the speed of the thermal engine 20 can influence the speed of the cooling fluid pump 116, the thermal engine 20's power can exponentially decay if it slows down and then slows cooling fluid pump 116. Thus, preferably, the cooling fluid pump 116 should he electric driven and made independent of the thermal engine 20's crank shaft 145's motion.

The thermal mass 149 can be constructed with multiple layers of metal slabs so that it is easier to handle and easier to conform to the space requirements of a vehicle. In one preferred embodiment, the thermal mass 149 is constructed from long solid cylindrical rods surrounded by thin walled cylinders. Then the thermal battery passageways 150 can simply he the gap between the outer thin walled cylinders and the solid cylinder.

The thermal mass 149 can be made from a single casting with all the required passages already configured within it for the heat transfer fluid and the heating means. Thermal insulation may be added to the outer walls of the thermal battery vacuum case 148 to insulate and prevent loss of heat energy to the environment. Preferably, the thermal insulation is made from such as polyamides and ceramics fiber materials that can withstand extremely high temperatures. Such materials are available as wrap around tapes from companies such as Engineered Tapes Inc., and ABS Thermal Technologies in New York. The thermal mass 149 is preferably made from stainless steel and metal alloys, but can also be made from ceramics, silicates, clays or carbon compounds. Preferably a dense material with a high heat storage capacity should he used to achieve a high storage heat capacity in the thermal mass 149. Such dense materials that may be used for a thermal mass 149 include iron, lead, stainless steel, titanium, aluminum, molten salts, carbon composites, fiber glass composites and ceramics. The heat energy storage density is a function of the density of the material since the mass 149 is a function of the density.

Examples of the heat storage density of some materials are shown in the table below:

| Material | Heat storage density kJ/m$^3$ ° C. | Operating temperature range, ° C. |
| --- | --- | --- |
| Aluminum | 2484 | 680 |
| Cast Iron, Stainless Steel, | 3889 | 1151 |
| Ceramics | 2800 | 2000 |
| Taconite | 2500 | 2000 |
| Saltstream ™ 565 wax | 1960 | 565 |

The cooling fluid tank 141 should be made from durable water and pressure resistant materials such as Aluminum, Stainless steel or Fiberglass including Carbon. Since the cooling fluid tank 141 can be pressurized in some instances, it must be designed to hold adequate pressure and its construction should follow adequate guidelines for manufacture of pressure tanks of the required pressure ratings.

The thermal engine 20 components can be constructed from metal alloys commonly used in the manufacture of standard combustion engines. However, since the thermal loads that the thermal engine 20 is subjected to can be far less that regular combustion engines, it is possible to construct its components from aluminum alloys, ceramics, plastics and even carbon fiber materials. If water is used as a cooling fluid, it is even possible to manufacture the components using high temperature engineering plastics such as mentioned earlier. The design of the parts could be augmented by inserting stainless steel reinforcing parts to prevent the wear of the plastic due to the friction of the piston head 101 sliding in the cylinder chamber holes 110.

Advantageously, the use of engineering plastics could make the thermal engine 20 as light as possible to compensate for the additional weight that is needed for the thermal battery 30. Some other components of the thermal engine 20 such as the cams and the camshaft 133 and the crank shaft 113 could also be made from adequate engineered plastics that can withstand mechanical loads and heat. In all the cost of manufacture of the thermal engine 20 can be reduced considerably by a suitable choice of materials. The thermal battery temperature can be as high as 2000° F. to store as much heat as possible, however, nothing in this invention prevents the use of very high temperature materials such as ceramics and Tungsten alloys to make the thermal mass.

The invention is not limited to a four-stroke cycle. It may in fact use a two-stroke if heating fluid enters and extends the SMA spring 50 and then cooling fluid is sprayed into the cylinder chamber immediately after the first stroke. In fact, it is possible to use a two-stroke configuration in which the compression first upward stroke compresses air and heat the SMA spring and then the return stroke downward pulls a vacuum to cool the SMA spring immediately.

The engine starter is mechanically coupled to the drive shaft 145 by a drive means 136 such as gears or pulleys and belts. The engine starter is preferably an electric starter of conventional design that is operated by an electric battery. It could also be an air pressure starter or a rope starter similar to conventional pull rope starters used for small combustion engines. In the case when there are multiple piston heads 101 and cooperating cylinders incorporated into the thermal engine 20, the crank shaft offsets arc 180 o in phase to balance the thermal engine 20.

The thermal engine can be a two or four-stroke engine. In a two-stroke version, the second and third strokes are simply removed to achieve the same sequence of operation.

Every intake valve 128 is in common fluid communication with the intake manifold 70 and any intake valve 128 that is open will immediately transmit heating fluid into the cylinder expansion chamber 121 to operate on its corresponding piston head 101. Every exhaust valve 124 is in common fluid communication with the exhaust manifold 80 and so that any exhaust valve 124 that is open will immediately transmit the either cooling fluid or heating fluid or a combination of both out of the cylinder expansion chamber 121. The exhaust valve 124 is also designed to transmit cooling fluid into the cylinder expansion chamber 121. Further, a cooling fan 146 may be optionally attached to the output drive shaft 145 to cool a radiator 140.

The thermal engine 20 includes a heating means including at least an infrared heater, and alternatively, a resistance heating element extending into the thermal mass 149 and a resistance heating element circuit; a power connector for delivering electric current through at least one heating means and thereby heating thermal mass 149. Alternatively, thermal mass 149 can be heated by an electromagnetic induction heating means using inductive heating. Such heating means may be incorporated as part of the thermal mass 149 or may be a separate unit from the thermal mass 149. If induction heating is used, the thermal mass 149 may be heated quickly and non-intrusively. The external electromagnetic induction heating means may be an induction coil proximally placed to heat the thermal mass 149 without any contact with the thermal mass 149, so that in the event that the thermal engine 20 is installed in a vehicle or mobile device, the thermal mass 149 can be heated quickly by just passing through the vehicle or mobile device through the electromagnetic field of such the electromagnetic induction heating means without contact. This can allow for continuous charging of the thermal battery 30 while driving. Infrared heating bulbs can be used to directly heat the thermal mass 149 by radiation. Such heaters are readily available from companies like Dykast Inc.™ Wallow 1/32 Din digital temperature controller can be used to control the temperature of the thermal battery 30. If a high power fast charge is required, an Avatar 60 Amp Switch control relay for switching load with a fast soft start and voltage limitation control can he used to control the heating means.

It is important that the intake manifold 70 be insulated as much as possible so that the heating fluid retains as much heat as possible before it is introduced into the cylinder expansion chamber 121. It is important that the exhaust manifold 80 not be insulated so that as much heal can be taken out of the mixtures of cooling fluid and exhausted heating fluid from the exhaust manifold 80. The thermal engine 20 preferably operates on a noncombustible cooling fluid such as water or a refrigerant fluid; it is important that the cooling fluid have as high a heat of vaporization as possible. Water and refrigerants such as ammonia have the highest heat of vaporization per kilogram. In accordance with the present invention, a thermally charged thermal battery 30 is used to generate mechanical energy by a phase change of a solid SMA member and or a liquid such as water.

SMA springs 50 can be obtained from Kellogs Research Inc.™, SAES Getters Group™, Dynalloy Inc.™, FlexMet™ in the UK, and many other places.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A thermal engine, comprising:
a heating fluid source having heating fluid above ambient temperature;
a cylinder block containing at least one cylinder having a tubular cylinder side wall and a cylinder first end and a cylinder second end, defining a cylinder expansion chamber;
a valve block sealingly covering said cylinder first end 'having a cylinder intake opening and intake valve in fluid communication with said cylinder, and a cylinder exhaust opening and exhaust valve in fluid communication with said cylinder;
an intake manifold connecting said heating fluid source to said cylinder intake opening through said intake valve;
a piston head slidably and sealingly retained within said cylinder expansion chamber; defining a variable volume expansion chamber between said piston head and said tubular cylinder side wall and said valve block;
a crank shaft rotatably mounted perpendicular to said cylinder at said cylinder second end and having a crank shaft offset;
a connecting rod pivotally connected to said piston head and to said crank shaft offset; said piston head defining an oscillatory linear motion within said expansion chamber synchronized with said crank shaft rotation such that a first stroke starts with said piston head defining a minimum expansion chamber volume with said crank shaft offset substantially at its closest point to said piston head, and ends with said piston head defining a maximum expansion chamber volume with said crank shaft offset substantially at its farthest point from said piston head, and a second stroke starts with said piston head defining at the maximum expansion chamber volume and ends with said piston head defining a minimum expansion chamber volume;
and a thermally responsive shape memory alloy spring within said variable volume cylinder expansion chamber, extending between and bearing against said valve block and said piston head;
further during the start of said first stroke said shape memory alloy spring is in a minimally contracted martensitic state and said intake valve opens to let in heated heating fluid having a temperature sufficient to heat said shape memory alloy spring from a minimally contracted martensite state to a maximally extended austenite state, thereby exerting a force pushing and advancing said piston head within said expansion chamber to expand the volume of said expansion chamber to a maximum volume causing said exhaust valve to close, and driving said connecting rod to rotate said crankshaft and, said expansion of said expansion chamber lowering the pressure and the temperature of said heating fluid within said expansion chamber and thereby cooling said heating fluid cooling said shape memory alloy spring, and said cooling causing said shape memory alloy spring into a contracted, martensitic state and as said crankshaft continues to rotate it returns said piston head and recompresses said shape memory alloy spring again to a minimally contracted state, to repeat the cycle by starting another first stroke.

2. The thermal engine of claim 1, wherein said heated heating fluid source comprises a thermal battery including a thermal mass and a thermal mass fluid passageway in thermal communication with said thermal mass and having a passageway entrance and a passageway exit.

3. The thermal engine of claim 1, wherein said shape memory allow spring is made from metal allows of nickel and titanium.

4. The thermal engine of claim 1, wherein said shape memory allow spring is made from Nitinol.

5. The thermal engine of claim 1, wherein said shape memory allow spring is in a compressed martensitic state at a temperature below that of said heating fluid.

6. The thermal engine of claim 1, wherein said shape memory allow spring is in an extended austenite state when exposed to said heating fluid.

7. The engine of claim 3, wherein said heating fluid comprises water.

8. The thermal engine of claim 1, wherein said thermal mass fluid passageway passes one of through and around said thermal mass.

9. The thermal engine of claim 1, wherein said heating fluid comprises a gas.

10. The thermal engine of claim 1, additionally comprising a thermal battery vacuum case containing and spaced outwardly from said thermal mass defining a heating fluid flow space around said thermal mass, said thermal battery vacuum case having a case entry opening and a case exit opening.

11. The thermal engine of claim 1, additionally comprising a fluid pump for delivering heating fluid from said heat fluid source to said intake valve.

12. The thermal engine of claim 1, wherein said heating fluid source comprises a fluid tank.

13. The thermal engine of claim 1, wherein said shape memory alloy spring is configured as one of: a coil spring, a hyperboloid of rotation spring and at least one resilient wire having a first wire end bearing against said piston head and a second wire end and bearing against said valve block.

14. The thermal engine of claim 1, additionally comprising a cam shaft having an exhaust cam lobe in drivable relation with said exhaust valve, and an intake cam lobe in drivable relation with said intake valve, such that rotation of said cam shaft operates said intake valve an exhaust valve in opposing cycles.

15. The thermal engine of claim 14, additionally comprising push rods drivably connecting said intake cam lobe to said intake valve, and drivably connecting said exhaust cam lobe to said exhaust valve.

16. The thermal engine of claim 1, comprising a plurality of said cylinders and piston heads.

17. The thermal engine of claim 16, wherein said thermal engine is one of a two-stroke engine or a four-stroke engine.

18. The thermal engine of claim 1, additionally comprising a crank case enclosing at least part of said crank shaft.

19. The thermal engine of claim 1, additionally comprising a drive shaft drivably connected to said crank shaft.

20. The thermal mass of claim 1, additionally comprising an induction coil for movement relative to said thermal mass to heat said thermal mass.

21. A thermal engine, comprising:
a heating fluid source;
a thermal battery including a heated thermal mass and a thermal mass fluid passageway passing adjacent to and in thermal communication with said heated thermal mass and said fluid passageway having a passageway in said thermal mass with a passageway entrance and a passageway exit;
a cylinder block containing at least one cylinder having a tubular cylinder side wall and a cylinder first end and a cylinder second end, defining a cylinder expansion chamber;
a valve block sealingly covering said cylinder first end having a cylinder intake opening and an intake valve in fluid communication with said cylinder, and a cylinder exhaust opening and exhaust valve in fluid communication with said cylinder;
an intake manifold connecting said heating fluid source to said cylinder intake opening through said intake valve;
a piston head slidably and sealingly retained within said cylinder expansion chamber; defining a variable volume expansion chamber between said piston head and said tubular cylinder side wall and said valve block;
a crankshaft rotatably mounted perpendicular to said cylinder at said cylinder second end;
a connecting rod pivotally connected to said piston head and to said crankshaft; said piston head defining an oscillatory linear motion within said expansion chamber synchronized with said crankshaft rotation such that an engine first stroke starts with said piston head defining a minimum expansion chamber volume and ends with said piston head defining a maximum expansion chamber volume, and an engine second stroke starts with said piston head defining at the maximum expansion chamber volume and ends with said piston defining a minimum expansion chamber volume;
and a thermally responsive shape memory alloy spring within said variable volume cylinder expansion chamber, extending between and bearing against said valve block and said piston head;
further during the start of said first stroke said shape memory alloy spring is in a minimally contracted martensitic state and said intake valve opens to let in heated heating fluid having a temperature sufficient to heat said shape memory alloy spring and thereby cause expansion of said shape memory alloy spring from a minimally contracted and martensitic state to a maximally extended and rigid 0 austenite state, pushing and thereby advancing said piston head within said expansion chamber to expand the volume of said expansion chamber to a maximum volume causing said exhaust valve to close, and driving said connecting rod to rotate said crankshaft and, said expansion of said expansion chamber lowering the pressure and the temperature of said expansion fluid within said expansion chamber and thereby cooling said expansion fluid and thereby also cooling said shape memory alloy spring, and said cooling causing said shape memory alloy spring to transition into martensitic state permitting and as said crankshaft continuous to rotate it returns said piston head and recompresses said shape memory alloy spring again to a minimally contracted and martensitic state, to repeat the cycle by starting another stroke.

22. The thermal engine of claim 21, additionally comprising a thermal battery vacuum case containing and spaced outwardly from said thermal mass defining a heating fluid flow space around said thermal mass, said thermal battery vacuum case having a case entry opening and a case exit opening.

23. The thermal engine of claim 21, wherein said thermal mass fluid passageway passes one of through and around said thermal mass.

24. The thermal engine of claim 23, additionally comprising a thermal battery vacuum case containing and spaced outwardly from said thermal mass defining a heating fluid flow space around said thermal mass, said thermal battery vacuum case having a case entry opening and a case exit opening.

25. The thermal engine of claim 21, wherein said shape memory alloy spring is configured as one of: a coil spring, a hyperboloid of rotation spring and at least one resilient wire having a first wire end bearing against said piston head and a second wire end and bearing against said valve block.

* * * * *